(12) United States Patent
Grue et al.

(10) Patent No.: US 11,483,417 B2
(45) Date of Patent: Oct. 25, 2022

(54) SYSTEMS AND METHODS FOR MANAGING CONTENT ITEMS HAVING MULTIPLE RESOLUTIONS

(71) Applicant: DROPBOX, INC., San Francisco, CA (US)

(72) Inventors: Anthony Grue, San Francisco, CA (US); Andrew Haven, San Francisco, CA (US); Andrew Scheff, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/323,858

(22) Filed: May 18, 2021

(65) Prior Publication Data
US 2021/0274015 A1 Sep. 2, 2021

Related U.S. Application Data

(63) Continuation of application No. 16/802,099, filed on Feb. 26, 2020, now Pat. No. 11,025,746, which is a
(Continued)

(51) Int. Cl.
*H04L 29/08* (2006.01)
*H04L 67/61* (2022.01)
(Continued)

(52) U.S. Cl.
CPC .............. *H04L 67/61* (2022.05); *G06F 16/50* (2019.01); *G06F 16/5866* (2019.01);
(Continued)

(58) Field of Classification Search
CPC ........... H04N 1/00145; H04N 1/00164; H04N 21/234363; H04N 2201/325;
(Continued)

(56) References Cited

U.S. PATENT DOCUMENTS 4,475,172 A 10/1984 Frederiksen
5,321,520 A 6/1994 Inga et al.
(Continued)

FOREIGN PATENT DOCUMENTS

JP 2006244221 A 9/2006
JP 2007502092 A 2/2007
(Continued)

OTHER PUBLICATIONS

Bieber G., et al., "TiDi Browser: A Novel Photo Browsing Technique for Mobile Devices," Proceeding of SPIE, Feb. 15, 2007, vol. 6507, pp. 1-8.
(Continued)

*Primary Examiner* — Chirag R Patel
(74) *Attorney, Agent, or Firm* — Keller Preece PLLC

(57) ABSTRACT

Systems, methods, and non-transitory computer readable media for managing content items having multiple resolutions may be provided. In some embodiments, a user device may send a request to access one or more images from a content management system. The one or more images may be categorized on the user device by an expected use that determines that the one or more images be in a first version. A second version of the one or more images may be received while a background download of the first version of the one or more images may be performed. In some embodiments, the first version may correspond to a high-resolution image whereas the second version may correspond to a lower resolution image.

20 Claims, 11 Drawing Sheets

Related U.S. Application Data continuation of application No. 15/690,126, filed on Aug. 29, 2017, now Pat. No. 10,594,834, which is a continuation of application No. 14/247,436, filed on Apr. 8, 2014, now Pat. No. 9,787,799.

(60) Provisional application No. 61/945,806, filed on Feb. 27, 2014.

(51) Int. Cl.

| | | |
|---|---|---|
| *H04N 1/00* | (2006.01) | |
| *G06F 16/50* | (2019.01) | |
| *G06F 16/957* | (2019.01) | |
| *G06F 16/58* | (2019.01) | |
| *H04M 1/72445* | (2021.01) | |

(52) U.S. Cl.
CPC ...... *G06F 16/957* (2019.01); *H04M 1/72445* (2021.01); *H04N 1/00132* (2013.01)

(58) Field of Classification Search
CPC ........ H04N 2201/3274; H04N 1/00132; H04L 65/601; G06F 16/50; G06F 16/5866; G06F 16/957
See application file for complete search history.

(56) References Cited

U.S. PATENT DOCUMENTS

| | | | |
|---|---|---|---|
| 5,920,327 | A | 7/1999 | Seidensticker, Jr. et al. |
| 5,983,263 | A | 11/1999 | Rothrock et al. |
| 6,006,231 | A * | 12/1999 | Popa .................. G06F 16/9577 709/219 |
| 6,122,411 | A | 9/2000 | Shen et al. |
| 6,144,996 | A | 11/2000 | Starnes et al. |
| 6,281,874 | B1 | 8/2001 | Sivan et al. |
| 6,496,206 | B1 | 12/2002 | Mernyk et al. |
| 6,509,900 | B1 * | 1/2003 | Ohsawa ................. G06F 12/121 711/E12.07 |
| 6,545,687 | B2 | 4/2003 | Scott et al. |
| 6,549,674 | B1 | 4/2003 | Chui et al. |
| 6,563,517 | B1 | 5/2003 | Bhagwat et al. |
| 6,578,072 | B2 | 6/2003 | Watanabe et al. |
| 6,633,608 | B1 | 10/2003 | Miller |
| 6,738,155 | B1 | 5/2004 | Rosenlund et al. |
| 6,898,601 | B2 | 5/2005 | Amado et al. |
| 7,000,188 | B1 | 2/2006 | Eustace |
| 7,092,118 | B2 | 8/2006 | Ferriere |
| 7,154,621 | B2 | 12/2006 | Rodriguez et al. |
| 7,185,069 | B2 | 2/2007 | Cronin, III et al. |
| 7,423,653 | B2 | 9/2008 | Gettman et al. |
| 7,467,160 | B2 * | 12/2008 | McIntyre ............ G07F 17/0014 |
| 7,574,653 | B2 | 8/2009 | Croney et al. |
| 7,603,409 | B2 | 10/2009 | Kobayashi et al. |
| 7,737,993 | B2 | 6/2010 | Kaasila et al. |
| 7,818,355 | B2 | 10/2010 | Mills et al. |
| 7,929,027 | B2 | 4/2011 | Okamoto et al. |
| 7,991,837 | B1 | 8/2011 | Tahan et al. |
| 8,078,230 | B2 | 12/2011 | Schuler et al. |
| 8,082,327 | B2 | 12/2011 | Schlusser et al. |
| 8,156,132 | B1 * | 4/2012 | Kaminski, Jr. ..... G06F 16/5838 707/758 |
| 8,161,179 | B2 | 4/2012 | Dote et al. |
| 8,166,383 | B1 | 4/2012 | Everingham et al. |
| 8,185,591 | B1 | 5/2012 | Lewis |
| 8,208,006 | B2 | 6/2012 | Martin-Cocher et al. |
| 8,312,388 | B2 | 11/2012 | Yoshihama et al. |
| 8,411,758 | B2 | 4/2013 | Folgner et al. |
| 8,417,599 | B2 | 4/2013 | Wirth, Jr. |
| 8,570,335 | B2 | 10/2013 | Huang et al. |
| 8,605,348 | B2 | 12/2013 | Bosma |
| 8,893,026 | B2 | 11/2014 | Lindemann et al. |
| 8,898,208 | B2 | 11/2014 | Wu et al. |
| 9,405,500 | B1 | 8/2016 | Cox |
| 9,462,054 | B2 | 10/2016 | Poletto et al. |
| 9,787,799 | B2 | 10/2017 | Grue et al. |
| 9,870,802 | B2 | 1/2018 | Carson et al. |
| 9,967,514 | B2 | 5/2018 | Thompson et al. |
| 10,051,142 | B1 | 8/2018 | Villena et al. |
| 10,491,963 | B1 | 11/2019 | Waggoner |
| 2002/0051065 | A1 | 5/2002 | Takahashi et al. |
| 2002/0054115 | A1 | 5/2002 | Mack et al. |
| 2002/0138630 | A1 | 9/2002 | Solomon et al. |
| 2002/0172421 | A1 | 11/2002 | Kondo et al. |
| 2003/0020749 | A1 | 1/2003 | Abu-Hakima et al. |
| 2003/0076322 | A1 | 4/2003 | Ouzts et al. |
| 2003/0218682 | A1 | 11/2003 | Lim et al. |
| 2004/0003117 | A1 | 1/2004 | McCoy et al. |
| 2004/0024643 | A1 * | 2/2004 | Pollock ................. G06Q 20/20 705/16 |
| 2004/0109063 | A1 | 6/2004 | Kusaka et al. |
| 2004/0133924 | A1 | 7/2004 | Wilkins et al. |
| 2004/0175764 | A1 | 9/2004 | Nishiyama et al. |
| 2005/0052685 | A1 | 3/2005 | Herf et al. |
| 2005/0097445 | A1 | 5/2005 | Day et al. |
| 2005/0177796 | A1 | 8/2005 | Takahashi et al. |
| 2006/0037053 | A1 | 2/2006 | McDowell et al. |
| 2006/0055944 | A1 | 3/2006 | Minakuti et al. |
| 2006/0109343 | A1 * | 5/2006 | Watanabe ............ G02B 21/365 359/369 |
| 2006/0114820 | A1 | 6/2006 | Hunt et al. |
| 2006/0152600 | A1 | 7/2006 | Hamada et al. |
| 2006/0173974 | A1 | 8/2006 | Tang et al. |
| 2006/0176305 | A1 | 8/2006 | Arcas et al. |
| 2006/0193012 | A1 | 8/2006 | Wilkins et al. |
| 2006/0242163 | A1 | 10/2006 | Miller et al. |
| 2006/0282788 | A1 | 12/2006 | Paalasmaa et al. |
| 2007/0022174 | A1 | 1/2007 | Issa et al. |
| 2007/0047650 | A1 | 3/2007 | Vilei et al. |
| 2007/0133042 | A1 | 6/2007 | Park et al. |
| 2007/0156434 | A1 | 7/2007 | Martin et al. |
| 2007/0226255 | A1 * | 9/2007 | Anderson ............... G06F 16/58 |
| 2007/0253628 | A1 | 11/2007 | Brett et al. |
| 2007/0274563 | A1 | 11/2007 | Jung et al. |
| 2007/0277202 | A1 | 11/2007 | Lin et al. |
| 2007/0294333 | A1 | 12/2007 | Yang et al. |
| 2008/0005669 | A1 | 1/2008 | Eilertsen et al. |
| 2008/0025642 | A1 | 1/2008 | Kim |
| 2008/0189625 | A1 | 8/2008 | Zuta et al. |
| 2008/0267494 | A1 | 10/2008 | Cohen et al. |
| 2008/0320222 | A1 | 12/2008 | Dhodapkar |
| 2009/0006978 | A1 | 1/2009 | Swift et al. |
| 2009/0049408 | A1 | 2/2009 | Naaman et al. |
| 2009/0070675 | A1 | 3/2009 | Li et al. |
| 2009/0089448 | A1 | 4/2009 | Sze et al. |
| 2009/0183060 | A1 | 7/2009 | Heller et al. |
| 2009/0187857 | A1 | 7/2009 | Tanaka et al. |
| 2009/0198744 | A1 | 8/2009 | Nakamura |
| 2009/0284611 | A1 | 11/2009 | Wood et al. |
| 2010/0037137 | A1 | 2/2010 | Satou |
| 2010/0082818 | A1 | 4/2010 | Paul et al. |
| 2010/0100455 | A1 | 4/2010 | Song |
| 2010/0185987 | A1 * | 7/2010 | Yang ...................... G06F 16/54 715/838 |
| 2010/0269070 | A1 | 10/2010 | Kim |
| 2011/0010629 | A1 | 1/2011 | Castro et al. |
| 2011/0125755 | A1 | 5/2011 | Kaila et al. |
| 2011/0128150 | A1 | 6/2011 | Kanga et al. |
| 2011/0142335 | A1 * | 6/2011 | Ghanem ............... G06K 9/6215 382/218 |
| 2011/0157609 | A1 | 6/2011 | Brady et al. |
| 2011/0183278 | A1 | 7/2011 | Belasse et al. |
| 2011/0197123 | A1 | 8/2011 | Caine et al. |
| 2011/0200270 | A1 | 8/2011 | Kameyama |
| 2011/0206342 | A1 | 8/2011 | Thompson et al. |
| 2011/0264768 | A1 | 10/2011 | Walker et al. |
| 2011/0269437 | A1 | 11/2011 | Marusi et al. |
| 2011/0302482 | A1 | 12/2011 | Warnock et al. |
| 2012/0001935 | A1 | 1/2012 | Cok et al. |
| 2012/0005058 | A1 | 1/2012 | Buck |
| 2012/0011568 | A1 | 1/2012 | Tahan et al. |
| 2012/0102431 | A1 | 4/2012 | Krolczyk et al. |
| 2012/0151383 | A1 | 6/2012 | Kazan et al. |
| 2012/0158713 | A1 | 6/2012 | Jin et al. |

(56) References Cited

U.S. PATENT DOCUMENTS

| | | |
|---|---|---|
| 2012/0166478 A1 | 6/2012 | Das et al. |
| 2012/0209815 A1 | 8/2012 | Carson et al. |
| 2012/0210217 A1 | 8/2012 | Abbas et al. |
| 2012/0323868 A1 | 12/2012 | Robbin et al. |
| 2012/0324397 A1 | 12/2012 | Patz et al. |
| 2012/0331371 A1 | 12/2012 | Larson et al. |
| 2013/0064439 A1 | 3/2013 | Khurd et al. |
| 2013/0080974 A1 | 3/2013 | Suzuki et al. |
| 2013/0111368 A1 | 5/2013 | Laughlin |
| 2013/0159936 A1 | 6/2013 | Yamaguchi et al. |
| 2013/0187946 A1 | 7/2013 | Pan et al. |
| 2013/0204961 A1 | 8/2013 | Fliam et al. |
| 2013/0212067 A1 | 8/2013 | Piasecki et al. |
| 2013/0239003 A1 | 9/2013 | Usenko et al. |
| 2013/0290862 A1 | 10/2013 | Chand et al. |
| 2013/0332856 A1 | 12/2013 | Sanders et al. |
| 2014/0040811 A1 | 2/2014 | Brahmanapalli et al. |
| 2014/0053206 A1 | 2/2014 | Shoykher et al. |
| 2014/0068689 A1 | 3/2014 | Sirpal et al. |
| 2014/0074759 A1 | 3/2014 | Lewis et al. |
| 2014/0111516 A1 | 4/2014 | Hall et al. |
| 2014/0122505 A1 | 5/2014 | Kudo |
| 2014/0140400 A1 | 5/2014 | George et al. |
| 2014/0169684 A1* | 6/2014 | Samii .................. G06K 9/6215 382/218 |
| 2014/0189487 A1 | 7/2014 | Kwan et al. |
| 2014/0189539 A1 | 7/2014 | St. Clair et al. |
| 2014/0209326 A1 | 7/2014 | Delange et al. |
| 2014/0236720 A1 | 8/2014 | Shunock et al. |
| 2014/0282099 A1 | 9/2014 | Bronder et al. |
| 2014/0359482 A1 | 12/2014 | Sinn et al. |
| 2014/0365501 A1 | 12/2014 | Ueno et al. |
| 2015/0039601 A1 | 2/2015 | Harrang et al. |
| 2015/0070582 A1 | 3/2015 | Jung et al. |
| 2015/0117786 A1 | 4/2015 | James et al. |
| 2015/0145889 A1 | 5/2015 | Hanai et al. |
| 2015/0154167 A1 | 6/2015 | Arhin et al. |
| 2015/0178265 A1 | 6/2015 | Anderson et al. |
| 2015/0193347 A1 | 7/2015 | Kluesing et al. |
| 2015/0195371 A1 | 7/2015 | Nowakowski et al. |
| 2015/0201001 A1 | 7/2015 | Cabanillas et al. |
| 2015/0234885 A1 | 8/2015 | Weinstein et al. |
| 2015/0244794 A1 | 8/2015 | Poletto et al. |
| 2015/0244833 A1 | 8/2015 | Grue et al. |
| 2015/0254692 A1 | 9/2015 | Xu et al. |
| 2015/0256639 A1 | 9/2015 | Chow et al. |
| 2016/0041907 A1 | 2/2016 | Jung et al. |
| 2017/0123982 A1 | 5/2017 | Haven et al. |
| 2017/0139824 A1 | 5/2017 | Dragoljevic et al. |
| 2017/0324807 A1 | 11/2017 | Gu et al. |
| 2017/0366644 A1 | 12/2017 | Grue et al. |
| 2018/0007323 A1 | 1/2018 | Botusescu et al. |
| 2018/0032259 A1 | 2/2018 | Yook et al. |
| 2018/0364999 A1 | 12/2018 | Li |
| 2019/0005048 A1 | 1/2019 | Crivello et al. |

FOREIGN PATENT DOCUMENTS

| | | |
|---|---|---|
| JP | 2009531873 A | 9/2009 |
| JP | 2012008643 A | 1/2012 |
| JP | 2012069009 A | 4/2012 |
| WO | WO-0169585 A1 | 9/2001 |
| WO | WO-02082799 A2 | 10/2002 |
| WO | WO-2013177769 A1 | 12/2013 |

OTHER PUBLICATIONS

Brivio P., et al., "PileBars: Scalable Dynamic Thumbnail Bars," The 13rd International Symposium on Virtual Reality, Archaeology and Cultural Heritage VAST, 2012, 8 pages.

Communication under rule 71(3) EPC Intention to Grant for European Application No. 14827975.5 dated May 18, 2020, 7 pages.

Communication under Rule 71(3) EPC of intention to grant for European Application No. 14827975.5 dated Apr. 23, 2020, 7 pages.

European Summons to Attend Oral Proceedings Pursuant to Rule 115(1) EPC for EP Application No. 14827975.5 dated Oct. 28, 2019, 8 pages.

Examination Report for Australian Application No. 2017232144 dated Sep. 14, 2018, 7 pages.

Examination Report for EP Application No. 14827975.5 dated Feb. 20, 2019, 20 pages.

Final Office Action from U.S. Appl. No. 14/247,468, dated Jan. 13, 2020, 25 pages.

International Search Report and Written Opinion for PCT Application No. PCT/US14/72005 dated Mar. 31, 2015, 14 pages.

Jiang Z., et al., "Web Prefetching in a Mobile Environment," IEEE Personal Communications, IEEE Communications Society, vol. 5 (5), Oct. 1, 1998, pp. 25-34.

Lin C., et al., "Fast Browsing of Large-scale Images Using Server Prefetching and Client Caching Techniques," Located Via SPIE http://proceedings.spiedigitallibrary.org/proceeding.aspx?articleid=905231, Jul. 18, 1999, 12 pages.

Ma W.Y., et al., "Framework for Adaptive Content Delivery in Heterogeneous Network Environments," Proceedings of SPIE, SPIE—International Society for Optical Engineering, vol. 3969, DOI:10.1117/12.373537, ISSN 0277-786X, ISBN 978-1-62841-213-0, XP002374871, Jan. 24, 2000, pp. 86-100.

Moshfeghi M., et al., "Efficient image browsing with JPEG2000 internet protocol," located via SPIE—http://proceedings.spiedigitallibrary.org/proceeding.aspx?articleid=841364, Apr. 19, 2004, 12 pages.

Non-Final Office Action from U.S. Appl. No. 14/247,468, dated Jun. 15, 2020, 26 pages.

Non-Final Office Action from U.S. Appl. No. 16/193,157, dated Jun. 25, 2020, 28 pages.

Non-Final Office Action from U.S. Appl. No. 16/227,849, dated Mar. 2, 2021, 21 pages.

Non-Final Office Action from U.S. Appl. No. 16/802,099, dated Dec. 23, 2020, 7 pages.

Notice of Allowance from U.S. Appl. No. 14/247,468, dated Oct. 21, 2020, 10 pages.

Notice of Allowance from U.S. Appl. No. 15/690,126, dated Oct. 21, 2019, 5 pages.

Notice of Allowance from U.S. Appl. No. 16/193,157, dated Jan. 27, 2021, 6 pages.

Notice of Allowance from U.S. Appl. No. 16/802,099, dated Mar. 11, 2021, 7 pages.

Notice of Allowance for U.S. Appl. No. 14/247,436 dated May 25, 2017, 5 pages.

Notice of Allowance for U.S. Appl. No. 14/927,241 dated Oct. 29, 2018, 11 pages.

Notice of Allowance from U.S. Appl. No. 15/690,126, dated May 24, 2019, 8 pages.

Notice of Allowance from U.S. Appl. No. 15/690,126, dated Feb. 6, 2020, 2 pages.

Notice of Decision to Grant of Japanese Application No. 2018-191152 dated Mar. 9, 2020, 6 pages.

Notice of Reasons for Refusal of Japanese Application No. 2018-191152 dated Nov. 11, 2019, 9 pages.

Office Action for U.S. Appl. No. 14/247,436 dated Mar. 31, 2016, 16 pages.

Office Action for U.S. Appl. No. 14/247,436 dated Sep. 30, 2016, 22 pages.

Office Action for U.S. Appl. No. 14/927,241 dated Apr. 6, 2018, 16 pages. .

Plant W., et al., "Visualisation and Browsing of Image Databases," Located via SpringerLink—https://link.springer.com/chapter/10.1007%2F978-3-642-19551-8_1, 2011, pp. 3-57.

"The Layered Look: Better Responsive Images Using Multiple Backgrounds," Jun. 26, 2013, Wayback Machine, retrieved from https://web.archive.org/web/20131022160602/http://css-tricks.com/the-layered-look/ on Oct. 27, 2018, 27 pages.

Notice of Allowance from U.S. Appl. No. 16/227,849, dated Jun. 11, 2021, 8 pages.

Non-Final Office Action from U.S. Appl. No. 17/138,354, dated Mar. 1, 2022, 26 pages.

(56) References Cited

OTHER PUBLICATIONS

Non-Final Office Action from U.S. Appl. No. 17/138,379, dated Mar. 9, 2022, 16 pages.
Final Office Action from U.S. Appl. No. 17/138,354, dated Aug. 15, 2022, 20 pages.

* cited by examiner

SYSTEMS AND METHODS FOR MANAGING CONTENT ITEMS HAVING MULTIPLE RESOLUTIONS

CROSS REFERENCE TO RELATED APPLICATIONS

This application is a continuation of U.S. application Ser. No. 16/802,099, filed Feb. 26, 2020, which is a continuation of U.S. application Ser. No. 15/690,126, filed Aug. 29, 2017 issued as U.S. Pat. No. 10,594,834, which is a continuation of U.S. application Ser. No. 14/247,436, filed Apr. 8, 2014 issued as U.S. Pat. No. 9,787,799, which claims the benefit of and priority to U.S. Provisional Application No. 61/945,806, filed Feb. 27, 2014. Each of the aforementioned patent(s), and applications(s) is hereby incorporated by reference in its entirety.

BACKGROUND

Various embodiments generally relate to managing content items having multiple resolutions.

Although cameras and user devices including cameras are a staple of modern society, the ability to view, share, and interact with images may be greatly affected by network constraints. A user may have multiple images stored on their user device, however due to the finite storage limitations of their device, the user may not be able, or may not desire, to keep every image and/or video stored on their device. This problem, in recent times, has been overcome by the increased use in cloud storage systems and social media networks, which allow users to upload and store large quantities of images and videos that may be viewed and/or accessed upon a user's request.

However, access to the images and/or videos on the cloud storage systems and/or social media networks may not continually be available, thus making the user dependent on various factors to view their stored content. For example, low or weak internet connection or Wi-Fi signal may hinder local viewing or downloading of an image. A high resolution image stored on a content management system, for instance, may take longer to download to a user device than a lower resolution version of the same image. The user, however, may be unaware of these potential performance limitations when initially uploading to the cloud storage system and when capturing the images and/or videos that are to be uploaded. The complications that may arise are therefore felt more heavily once the user attempts to access and/or view the image and/or video, and is subject to the internet connection and/or the other various downloading constraints.

Furthermore, depending on the performance limitations, the user may not be able to access their stored image in the quality with which the user desires. For example, the user may have initially captured and/or uploaded a high-definition (e.g., 1080p) image to their content management system or cloud storage account. If the connectivity level is very low, downloading the high-definition image may be extremely difficult, and the resulting viewing may be pixelated or grayed out. Additionally, downloading the high-definition image may take a long period of time due to the image file size, and therefore the user may have to wait longer than desired to view and/or interact with the image on their local client device.

Thus, it would be beneficial for there to be systems and methods that allow a user to manage content items having multiple resolutions and that may be stored on a content management system or other cloud based storage provider, without the various performance constraints having an impact on the user experience.

SUMMARY

Systems, methods, and non-transitory computer readable mediums for managing content items having multiple resolutions are provided. Such systems may include one or more processors, a display screen, communications circuitry, storage, and memory containing instructions.

Such methods may include accessing a content management system from a user device over a communications network. In some embodiments, a user of the user device may have an authorized account on the content management system. For example, the content management system may be accessed using a dedicated content management application resident on the user device and/or a link to a webpage hosting the content management system. A request to download one or more content items, such as images, from the content management system may be sent in response to access being granted. In some embodiments, the one or more content items may include associated metadata. Categorization of the one or more content items may be performed based on an expected use of the content item(s) in response to the request. In some embodiments, the categorization may determine that a first version of the one or more content items may be required. In response to the categorization, a second version of the one or more content items may be downloaded to the user device from the content management system. As the second version of the one or more content items downloads, a background download of the first version of the one or more content items may be performed. In some embodiments, the first version of the one or more content items may have a higher resolution than the second version of the one or more content items.

In some embodiments, the categorization includes collecting the one or more content items based on various factors. For example, the categorization may be based on a user's ability to access one or more content items stored on their user device, scroll to a page where the one or more content items appear, and/or perform an action on the one or more content items. In some embodiments, the sharing, or previous shares, of the one or more content items may form a basis for collecting content items.

Such methods may also include determining a number of content items capable of being downloaded to the user device from a content management system based on one or more factors. The determined number of content items, such as images, may be downloaded from the content management system in a first resolution. A first grid view may be displayed on the user device that includes a first set of content items from the downloaded content items. Each content item of the first set of content items may be displayed and/or formatted in a second resolution, which may be lower than the first resolution. Any additional content items that may have been downloaded, but not displayed in the first grid view, may be cached. For example, additional content items may be cached in temporary cache memory on the user device. Furthermore, each content item of the cached additional content items may be displayed in one or more additional grid views.

In some embodiments, the one or more factors may include a level of connectivity between the user device and the content management system, available storage space on the user device, available battery charge of the user device, and/or a data plan associated with the user device. For example, the amount of content items downloadable may be dependent on whether the user device has a strong internet connection or a weak internet connection. The one or more factors may also correspond to a viewing history of content items on the user device. For example, recently viewed images may be downloaded prior to images that have not been viewed recently.

Such methods may also include accessing an account on a content management system across a communications network using communications circuitry resident on a user device. A first collection of content items stored in the accessed account may be downloaded to storage on the device in a first resolution and may be displayed on a display screen of the user device. In some embodiments, a distance may be determined between the first collection of content items and any additional content items stored within the account. The additional content items may be downloaded in a second resolution and/or a third resolution depending on the determined distance between the respective collections. For example, images that are determined to have a small distance between themselves and a currently viewed image may be downloaded in the second resolution, which may be of lesser quality than the first resolution. Continuing this example, images having a large distance between themselves and the currently viewed image may be downloaded in the third resolution, which may be of lesser quality than the second resolution.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which.

DETAILED DESCRIPTION

Methods, systems, and computer readable media for managing content items having multiple resolutions are provided. Users may be able to interact and view content items, such as images, on a user device in a first resolution while a second resolution version of the content item or items downloads, or attempts to download, in the background. As used herein, a "background" process may be any process that is not directly related to the user's current interaction with the user device.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

Figure 1:
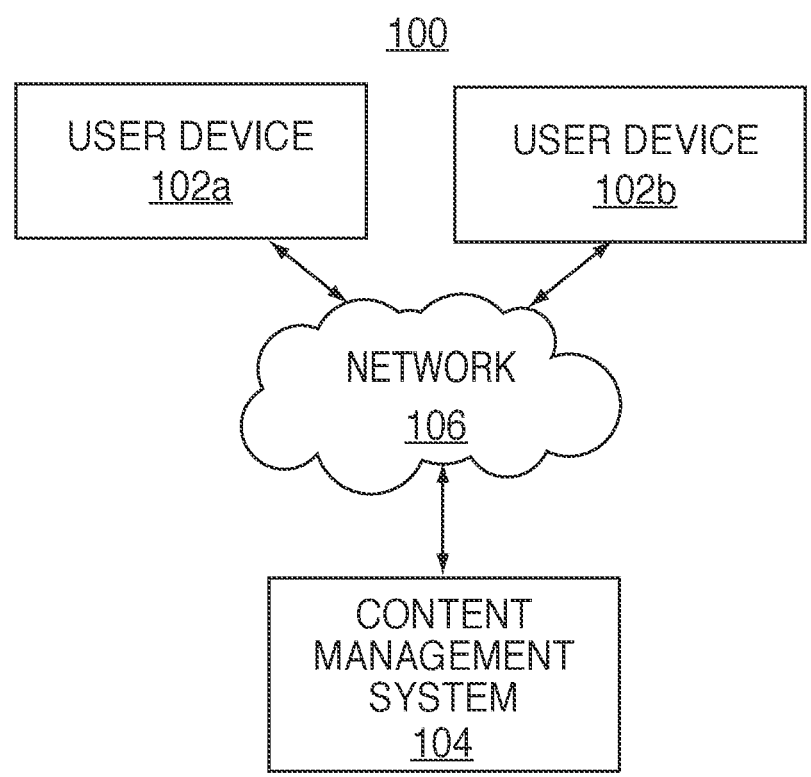
FIG. 1 shows an exemplary system in accordance with various embodiments.

FIG. 1 shows an exemplary system in accordance with various embodiments. System 100 may include user devices 102a and 102b, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102a and user device 102b (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 11.

In some embodiments, user interface 200 may display a set of images, such as images 202. Images 202 may, for example, be displayed in a grid view, which may include rows and columns of images. Persons of ordinary skill in the art will recognize that any amount of rows and columns may be used, and any amount of images may be displayed within set 202. For example, set 202 may include nine (9), sixteen (16), one hundred (100), or one thousand (1,000) images, or any other amount of images. In some embodiments, the displayed set of images may include a certain amount of fully displayed images and some images that have only a portion displayed. The portion of images may correspond to images that are displayed within a proximate display window to the currently displayed window. In some embodiments, these images may be viewed in full by the user performing one or more actions, such as a swipe, a click, or a scroll.

The images included within set 202 may be presented in any suitable format. For example, some or all of the images within set 202 may be high-definition images and/or videos, standard definition images and/or videos, or any other combination, thereof. The various formats of each image within set 202 may correspond to the display resolution of the image or images. The display resolution of an image may correspond to the number of pixels in each dimension of the image that may be displayed. In some embodiments, the resolution of the images presented within set 202 may be limited by the display resolution capabilities of the user interface (and thus the display screen displaying the user interface). Various resolutions of the images may include, but are not limited to, standard definition (e.g., 480i, 576i), enhanced definition (e.g., 480p, 576p), high-definition (e.g., 720p, 1080i, 1080p), and/or ultra-high-definition (e.g., 2160p, 4320p, 8640p), or any other resolution.

In some embodiments, a user may select one or more images from set 202 to view in a full-screen mode. For example, the user may select image 204 from set 202 using finger 206. Any gesture or combination of gestures may be used to select images. For example, finger 206 may select image 204 by tapping thereon.

Selected image 204 may initially be displayed within set 202 in a first resolution, such as a thumbnail resolution (e.g., 75×75 pixels). Persons of ordinary skill in the art will recognize that thumbnail resolution may encompass multiple pixel levels including, but not limited to, 100×100 pixels, 160×160 pixels, 200×200 pixels, or any other combination, permutation, or within the range thereof. Presenting image 204 in a thumbnail resolution may be due, at least in part, to the difficulty in presenting multiple or all images from set 202 in the highest resolution available. For example, if the device does not have enough storage space to store every image included within set 202 in high-definition (e.g., 1080p), set 202 may initially be displayed and stored in a lower resolution (e.g., a thumbnail resolution).

Upon selection of image 204, a request to view the image in a full screen mode or a single image view may be sent to a content management system (e.g., content management system 100) across a network (e.g., network 104). For example, while locally the device may only store and display lower resolution images in set 202, a user may have higher resolution versions of the images stored within their account on the content management system. In response to detecting a selection of one or more images from set 202 by the user, the content management system may locate and send a high quality or high resolution version of image 204 to the user device. In some embodiments, the content management system may include its own separate interface 250, which may or may not be viewable to the user. In some embodiments, activities rendered on the content management system may be performed without a physical interaction from the user. However, for illustrative purposes, content management system interface 250 may be presented herein. Interface 250 may receive the request to display a single image view of image 204 in response to its selection from set 202. Interface 250, (and content management system 100), may then locate high-quality image 254 within the user's account on the content management system. Image 254 may, in some embodiments, be substantially similar image 204, with the exception that image 254 may be of a higher resolution.

In some embodiments, image 254 may be sent to the user device and displayed within user interface 200. Set 202, which initially was displayed within user interface 200, may be replaced by image 254 on user interface 200, and may take up any amount of the display screens. For example, image 254 may be displayed in a "full screen" mode on the user interface, and may occupy all or substantially all of user interface 200. Image 254 may also occupy only a portion of the display space available on user interface 200. In some embodiments, both a portion of set 202 and image 254 may be displayed within user interface 200.

In some embodiments, the process of selecting image 204, sending the request to the content management system for the higher resolution version (e.g., image 254), and the presenting of image 254 in the single image view, may all occur at a substantially same time. For example, a user may select image 204 and subsequently be presented with image 254 in the single image view, with a minimal time delay. However, this may depend on a level of connectivity between the user device and the content management system, as transmission of the request and downloading the higher resolution image may depend on the network connections and/or other performance characteristics. In some embodiments, this may be resolved by locally caching one or more of the images from set 202 thereby reducing any time delay between selection of image 204 and viewing of image 254.

In some embodiments, image 254 and/or other high-quality versions corresponding to the images included within set 202 may be downloaded in the background. For example, as the user interacts with set 202, various high-quality versions of images may download in the background, such as image 254. This may allow the user to view a selected image in the single image view without waiting for the request to be sent to the content management system and the image sent back. In some embodiments, the higher resolution versions of the images may be dynamically prioritized for download to the user device. For example, images that have recently been viewed, recently been stored, and/or recently uploaded, may be prioritized to be downloaded.

Figure 3:
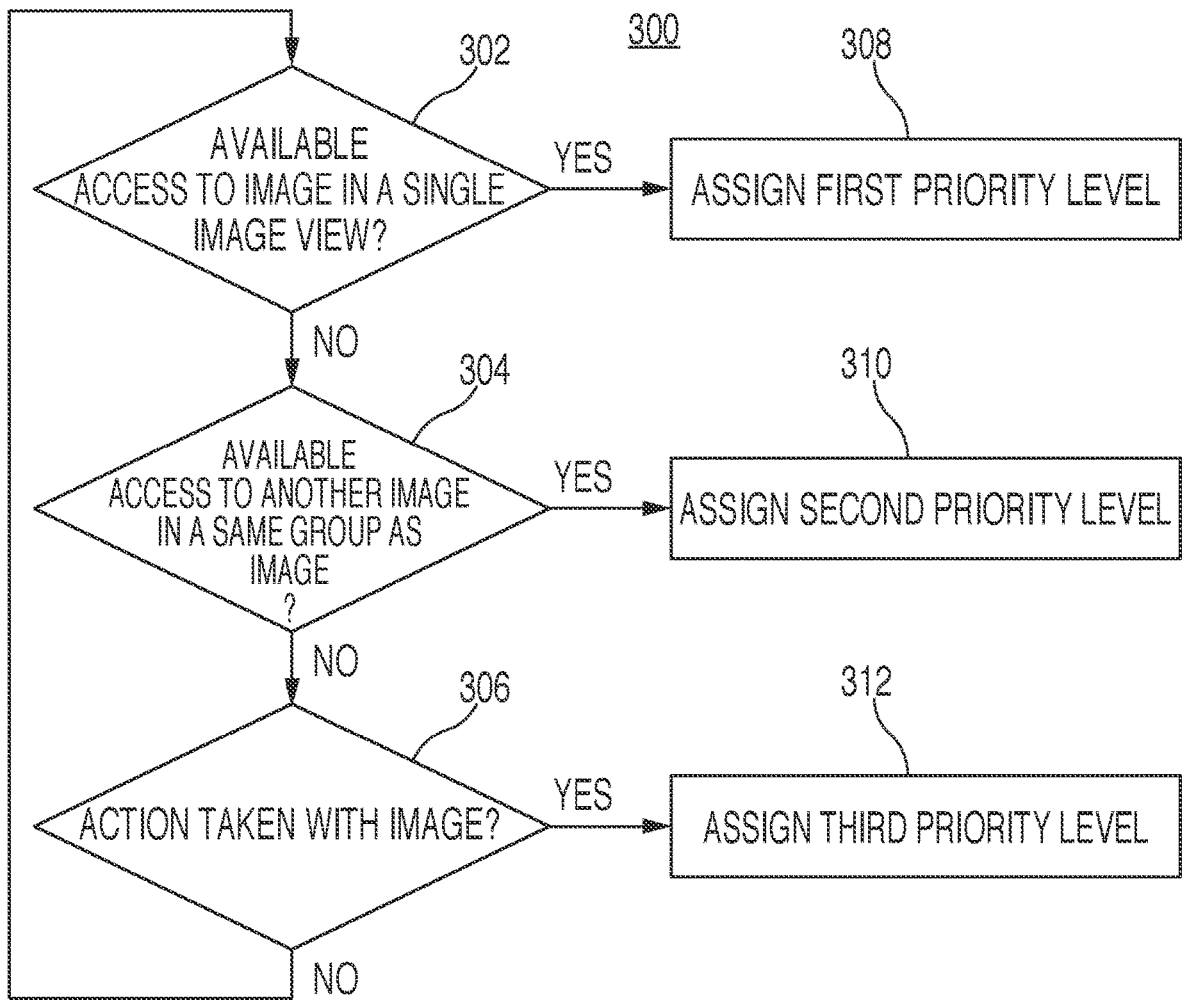
FIG. 3 shows an illustrative flowchart assigning priority levels to images based on a downloading priority order in accordance with various embodiments.

FIG. 3 shows an illustrative flowchart assigning priority levels to images based on a downloading priority order in accordance with various embodiments. Process 300 may begin at step 302. At step 302, a determination may be made as to whether images selected to be viewed in a single view mode are available. The determination may be performed on the user device, the content management system, or may be split between both (e.g., may begin on the user device and may complete on the content management system). For example, the selected image (e.g., image 204) may not be available to be viewed in the single view mode because of a lack of network connectivity. The single view mode may require or may attempt to obtain a high-quality version of image 204 (e.g., image 254), however due to a lack of network connectivity between the user device and the content management system, the high-quality image may not be immediately available. If at step 302, access is unavailable, process 300 may proceed to step 304. If access is available, process 300 may proceed to step 308 where a first priority level may be assigned to the one or more selected images.

At step 304, a determination may be made as to whether any additional images located within a same collection as the selected images are available. For example, image 204 may be located within a collection of images, such as set 202. If one or more of the additional images within collection 202 is accessible, then the selected image or images may be assigned a second priority level. If not, process 300 may proceed to step 306.

At step 306, a determination may be made as to whether or not an action has been taken with the one or more selected images. For example, if the user has shared, edited, and/or performed any other task to a selected image, that image may be assigned a third priority level. If not, process 300 may proceed back to step 302 and wait for access to become available to the one or more images in the single view mode.

In some embodiments, the priority level assigned to the one or more selected images may determine the order for the downloading images from the user account on the content management system to the user device. Although the aforementioned example assigns a first, second, and third priority level to selected images, persons of ordinary skill in the art will recognize that any priority level and any assignment of priority levels may be performed based on any characteristic, and the previously described scenarios are merely exemplary. For example, many different paradigms of ordering may be used for dynamic prioritization. In some embodiments, the first priority level may be ranked higher than both the second priority level and the third priority level. For example, the ordering of dynamic prioritization may be the first priority level, the second priority level, and the third priority level. In this scenario, the first priority level is ranked higher, and therefore may download before the items assigned the second priority level. Also in this scenario, the second priority level may be ranked higher than the third priority level, and items assigned the second priority level may download before items assigned the third priority level. As another example, the ordering of the dynamic prioritization may have the first priority level ranked higher than the third priority level, which may be ranked higher than the second priority level. Persons of ordinary skill in the art will recognize that any permutation of priority levels may be implemented, and the aforementioned ordering and assigning of priority levels and rankings is merely exemplary. Furthermore, persons of ordinary skill in the art will also recognize that any number of items may be assigned any number of priority levels, and the user of three priority levels is merely exemplary. Persons of ordinary skill in the art will also recognize that any step from process 300 may be performed on the user device, an additional device, the content management system, or any combination thereof.

Figure 4:
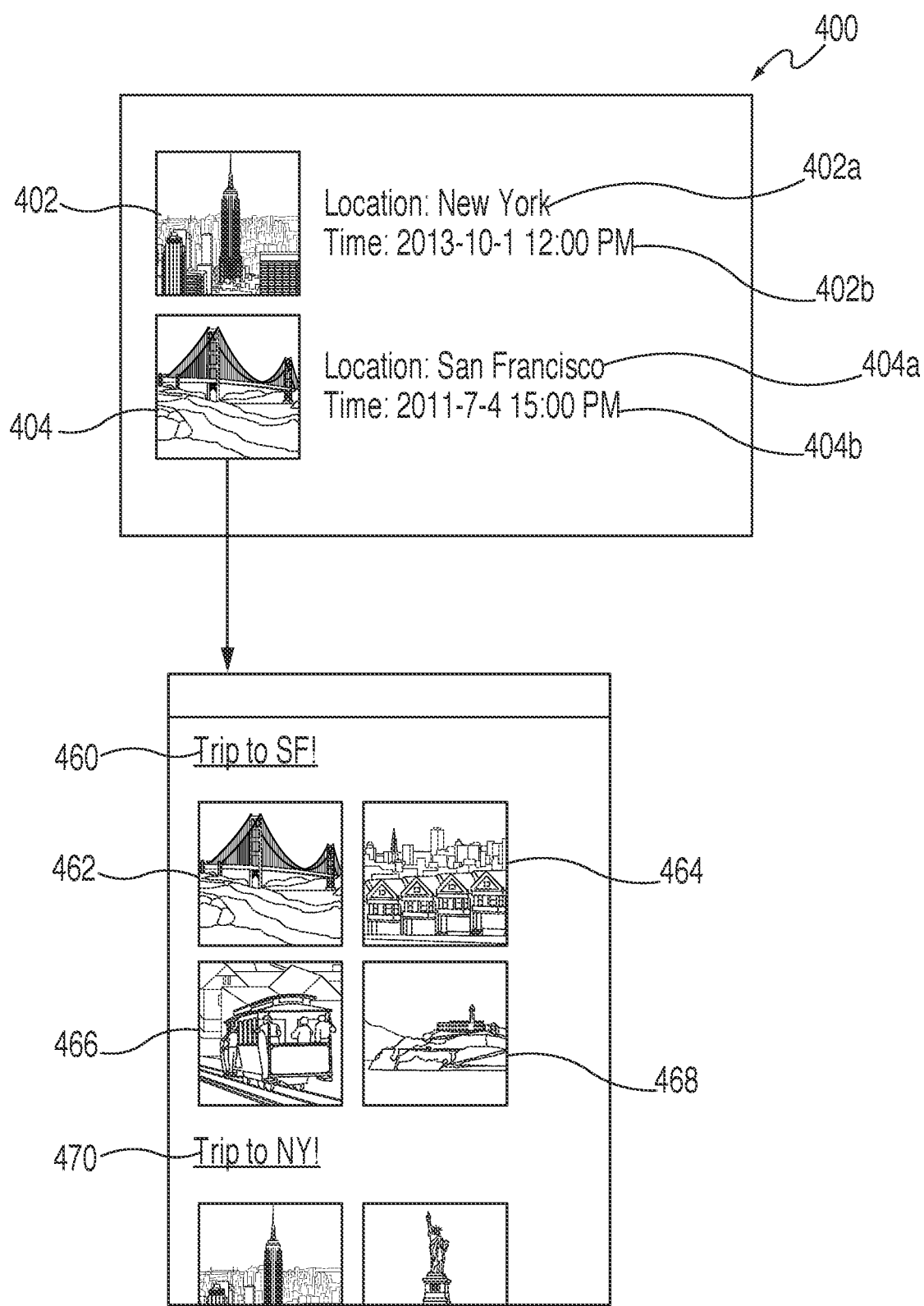
FIG. 4 shows a schematic illustration of categorizing images within collections on a user device in accordance with various embodiments.

FIG. 4 shows a schematic illustration of categorizing images within collections on a user device in accordance with various embodiments. Interface 400 may correspond to a particular portion of a content management system, and may include images having associated metadata. In some embodiments, interface 400 may correspond to a display output of a content management system (e.g., content management system 100), if a user were capable of directly accessing and interacting with the content management system. For example, a user may access and attempt to view images stored within their user account on content management system 100. In some embodiments, interface 400 may correspond to a display that the user may be presented with in response to an attempt to view some, or all, of the images stored within their user account.

Interface 400 may display images 402 and 404. Although only two images are included within interface 400, persons of ordinary skill in the art will recognize that any number of images may be presented to the user and/or stored within the users account, and the use of two images is merely exemplary. In some embodiments, images displayed within interface 400 may include associated metadata. For example, images 402 and 404 may respectively include geographical information 402a and 404a, as well as temporal information 402b and 404b. Geographical information 402a may indicate the location where image 402 was captured (e.g., New York City), whereas temporal information 402b may indicate the time and/or date that image 402 was captured (e.g., Oct. 1, 2013, 12:00 PM). Geographical information 404a may indicate the location where image 404 was captured (e.g., San Francisco), whereas temporal information 404b may indicate the time and/or date that image 404 was captured (e.g., Jul. 4, 2011, 3:00 PM). In some embodiments, date and time handling may be synchronized across multiple time zones in order to provide uniformity for processing the images.

The associated metadata may, in some embodiments, also include exchangeable image file format (Exif) data received from the camera. The camera may assign a different extensions to images or videos, image types (e.g., panoramic), multi-shots, or any other capture content. In some embodiments, the associated metadata may correspond to recently uploaded, viewed, or shared images by the user. For example, images that have been recently shared may have shared indicator flag showing the value 1 or True, indicating that those images have been shared. In some embodiments, the associated metadata may include information regarding an amount of times a particular image or collection has been viewed. For example, each image may include a viewing history indicating when that image was viewed, how many times the image was viewed, or any other viewing criteria. As another example, recently shared images may be categorized together in a collection.

Figure 2:
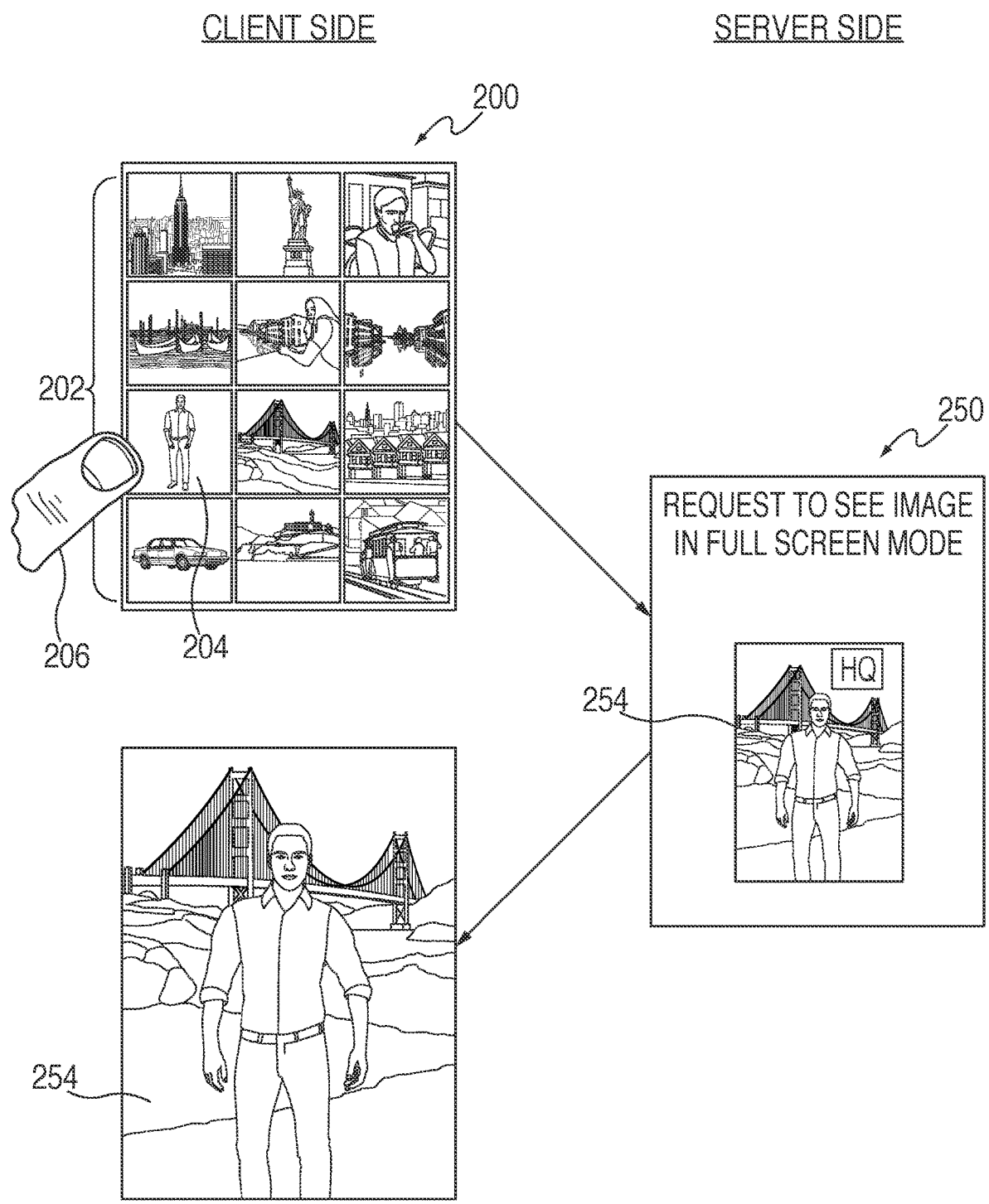
FIG. 2 shows a schematic illustration corresponding to an exemplary user interface displaying images having varying resolutions in accordance with various embodiments.

In some embodiments, images included within the user account may be categorized using the associated metadata, and collected into one or more collections based on the associated metadata. User interface 450 may correspond to a user interface displayed on a user's user device (e.g., devices 102). In some embodiments, user interface 450 may be substantially similar to user interface 200 of FIG. 2, with the exception that user interface 450 may include collections of images. User interface 450 may include collections 460 and 470, which may be formed based on one or more pieces of associated metadata stored within images on the user account. For example, collection 460 may correspond to images from a user's trip to San Francisco, and may include images 462, 464, 468, and 470 each having metadata substantially similar to geographical and/or temporal information 404a and 404b. As another example, collection 470 may correspond to images from the user's trip to New York City, and each image within collection 470 may have substantially similar geographical and/or temporal information 402a and 402b. In some embodiments, the categorization of images within a collection may be based on a user's recent viewing history, sharing history, any recently uploaded images, or content item type. For example, recently viewed images may be included within a specific collection.

In some embodiments, the user may request to download one or more images from their user account to their user device. As the image or images download, they may be categorized by the content management system and/or the device based on the metadata associated with the images. For example, any images that include geographical information 404a and/or temporal information 404b may be collected and placed within collection 460 on the user device. In some embodiments, one or more algorithms resident on the content management system, the user device, or split between both, may categorize and collect the images based on similar or substantially similar metadata. Any number of images may be categorized and collected into any number of collections. For example, all images stored within the user account may be categorized, however only a predefined amount may be sent within one or more collections to the user device.

In some embodiments, images stored within the user account may be displayed in a grid of images or a page including multiple grids of images. A grid of images may include any number of images in a low resolution, or a lower resolution than would be used to display an image in a single view mode. For example, in the single image view, an image may have a resolution of 154×154 pixels, whereas an image from within the grid may have a resolution of 75×75 pixels. The resolution values described above are merely exemplary, and persons of ordinary skill in the art will recognize that any pixel value may be used for both the single view mode and the grid. In some embodiments, all images stored within the user account may be categorized and collected into one or more grids, which may be sent to the user device. For example, there may be one thousand (1,000) images stored within the user account, and ten (10) grids including one hundred (100) images may be formed within the user account. Any number of the ten grids may be sent to the user device, however certain factors (e.g., available storage space) may determine the amount sent at a single time. Collecting images into grids may be extremely beneficial because this may allow a user to see a large quantity of images that they have stored within their user account faster than if the images were to be viewed individually. Furthermore, because a grid of images may include images having a lower resolution, the total storage size of the grid may be small, thus making it easier and faster to be viewed on the user device regardless of any network latency or storage constraints. For example, by collecting images in grids in a low resolution, larger amounts of images may be sent to the user device because each grid may include a large number of images all having a low resolution, which in aggregate, may equal one or more images in a single image view. As a particular example, a single grid including nine (9) images having a resolution of 64×64 pixels may require less bandwidth to send to a user device than one (1) 512×512 pixel image. Thus, the user may be able to view and interact with a larger quantity of images faster than they would normally be able to if only a high resolution image where sent.

Figure 5:
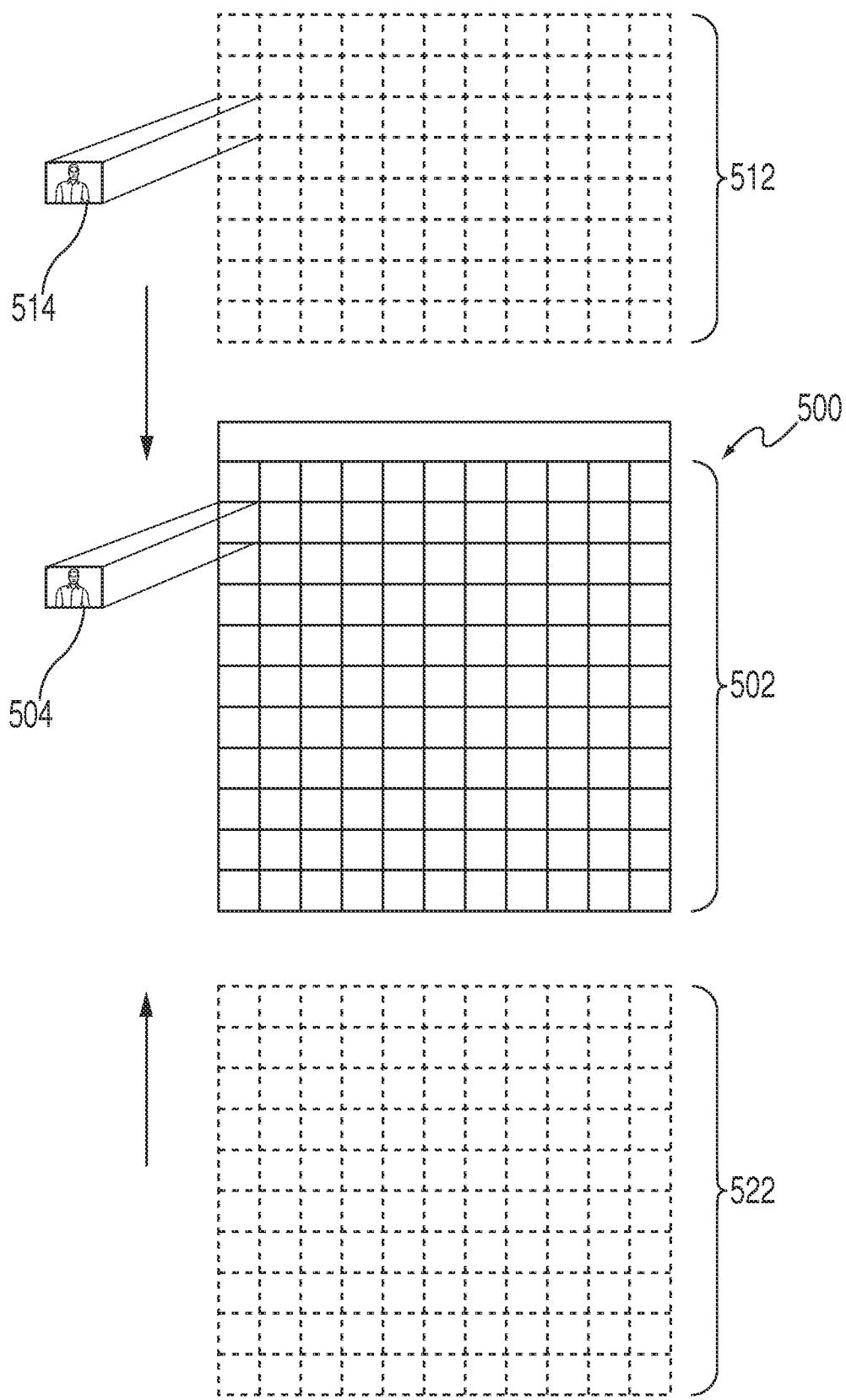
FIG. 5 shows an illustrative diagram of grid views capable of being displayed on a user interface in accordance with various embodiments.

FIG. 5 shows an illustrative diagram of grid views capable of being displayed on a user interface in accordance with various embodiments. User interface 500 may be displayed on a display screen of a user device (e.g., a touch-sensing display interface located on a user device). In some embodiments, user interface 500 may be substantially similar to user interface 400, with the exception that user interface 500 may display various images in a grid view.

Each grid may include any number of images, and the number of images may be set by the content management system and/or the user. For example, the system may calculate an amount of available storage space on the user device and, based on the calculation, create a number of grids to be sent to the user device. In some embodiments, the user may select how many images are to be included within a single grid view and/or may select the resolution of the images to be included within the grid. For example, the user may decide to have one hundred (100) images included in one grid, and based on the number specified by the user, one hundred images of a specific resolution (e.g., 75×75 pixels) may be created in a grid. As another example, the user may determine that the images included within the grid view may have a certain resolution and, based on this determination, an amount of images may be included within a grid based on the size and resolution of each image.

User interface 500 may include images 502 in a grid view. Images 502 may be displayed in a 10×10 grid or array (e.g., ten images per row, ten images per column). Although images 502 include a square grid (e.g., equal amount of images per row and column), persons of ordinary skill in the art will recognize that any number of images may be included within the grid, and any amount of images per row or per column may be used. For example, images 502 of the grid may include an array of 20×10 (twenty by ten) images, 5×5 (five by five) images, 15×8 (fifteen by eight) images, or any other collection of images, or any combination thereof.

In some embodiments, images included in grid views may be sent in blocks or pages of grid views. For example, images 502 may be sent in one page along with images 512 and images 522 in separate pages. Images 502 may be displayed within a window currently displayed on user interface 500, for example, while images 512 and 522 may be included in non-current windows that may be displayed within user interface 500. For example, while images 502 may initially be displayed in the current window of user interface 500, one or more user interactions (e.g., a swipe, flick, tap, etc.) may cause images 512 to be display within the current window of user interface 500.

Images included within one of the non-current windows (e.g., images 512 and 522), may be formatted in a lower resolution than the images displayed within the current window. For example, image 514 from images 512 of one of the non-current windows may be formatted in a lower resolution than image 504 from images 502 of the currently displayed window. For example, image 504 may have a thumbnail resolution of 75×75 pixels, whereas image 514 may have a resolution of 64×64 pixels. This may allow images included in non-current windows to occupy a smaller amount of storage space. In response to a gesture to transition from displaying a current window to a non-current window, images from the non-current window (e.g., images 512) may be downloaded from the content management system in a higher resolution, such as a thumbnail resolution, for example. In some embodiments, the resolutions of images included within various grid views may be dynamic, and may increase/decrease automatically in response to a detection of one or more gestures. For example, as previously mentioned, in response to a detected gesture, images 512 may be increased to have a higher resolution (e.g., from lower than a thumbnail resolution to a thumbnail resolution), whereas images 502 may have their resolution decreased accordingly.

The amount of images displayable within one or more grid views may be dependent on a variety of factors. For example, the user may determine how many images are to be included within a grid based on an amount of available storage space, an amount of total images stored within the user account, and/or a resolution of images displayable within the grid. In some embodiments, the user device and/or the content management system may determine how many images may be viewed within a grid view. For example, the user device may determine that only nine (9) images may be capable of being displayed on the user interface in one (1) grid.

Figure 6:
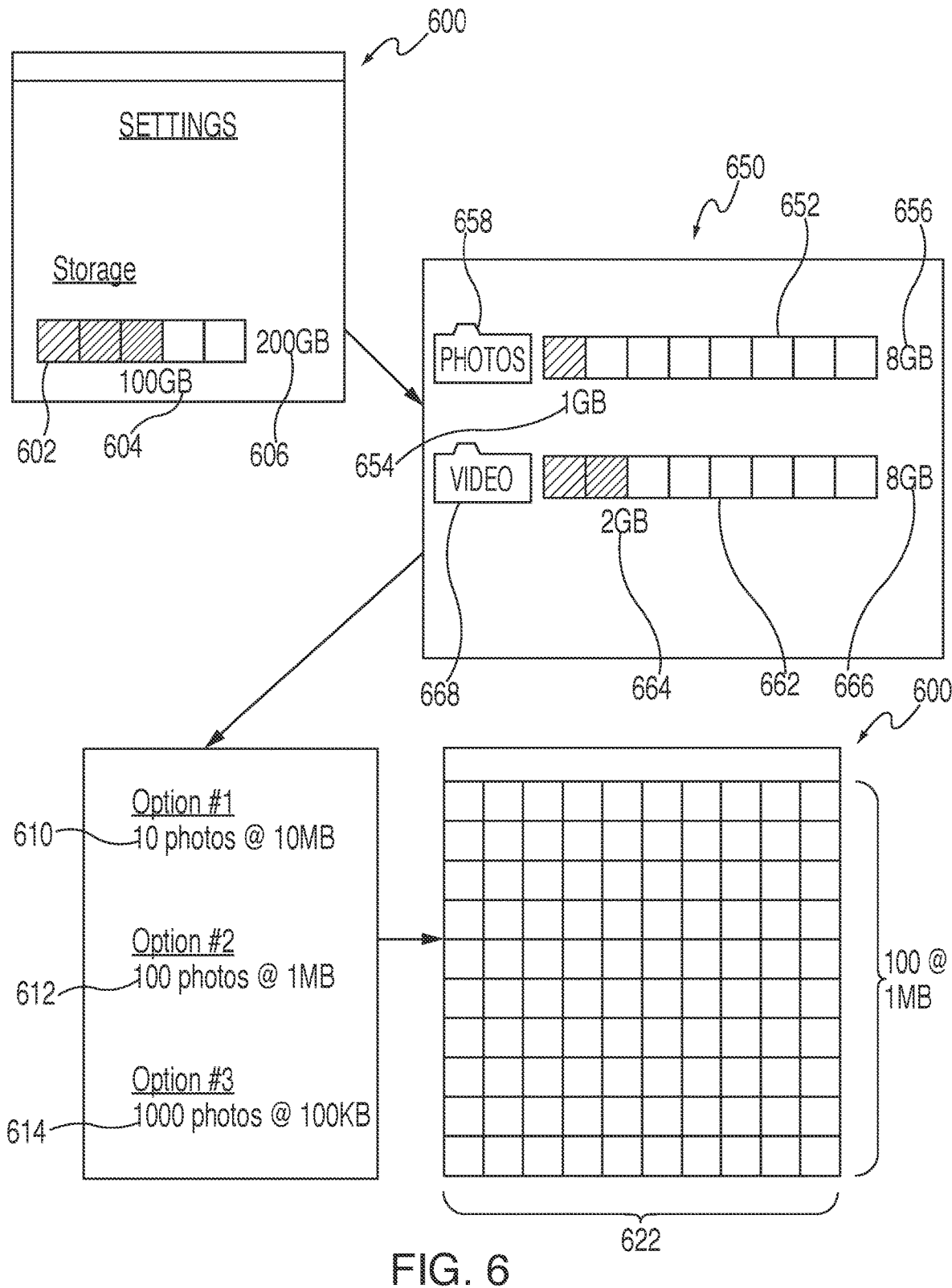
FIG. 6 shows a schematic illustration describing a formation of one or more grids in accordance with various embodiments.

FIG. 6 shows a schematic illustration describing a formation of one or more grids in accordance with various embodiments. User interface 600 may display a user's current storage setting on their user device. For example, the user's user device may run a status check to determine an amount of available storage. In some embodiments, the amount of available storage may be dependent on specific file types. For example, there may be a first amount of storage space available for music, a second amount of storage space available for images, and a third amount of storage space available for documents. This is merely exemplary, and persons of ordinary skill in the art will recognize that any amount of storage availability may be used, and form of content may have a specific amount of storage space available for that content type, and the use of a first, second, and third amount of storage space for music, images, and/or documents, is merely exemplary.

User interface 600 may include storage indicator 602. Storage indicator 602 may detail an amount of storage available to the user to download or add items to their device. Total storage 606 may correspond to the total amount of available storage space on the user's user device. For example, the user device may include 200 GB of storage space, which may be filled with any form of media, software, applications, or other items capable of being stored on the user's user device. Although total storage 606 corresponds to 200 GB, persons of ordinary skill in the art will recognize that any storage amount may be used including, but not limited to, 1 GB, 10 GB, 100 GB, or 1 TB. Current storage 604 may correspond to the total amount of storage currently occupied on the user device. For example, the user device may have 200 GB of total storage, with 100 GB currently occupied by one or more items stored on the user device.

User interface 650 may correspond to a displayable portion of the user account on a content management system, such as content management system 100. In some embodiments, user interface 650 may be substantially similar to user interface 250, with the exception that user interface 650 may include storage values of various media items within the user account. In some embodiments, user interface 650 may include photograph directory 658 and video directory 668. Each directory may also respectively include its own storage indicator, such as storage indicator 652 corresponding to photograph directory 658, and storage indicator 662 corresponding to video directory 668. Storage indicators 652 and 662 may be substantially similar to storage indicator 602, with the exception that each of storage indicators 652 and 662 may indicate an amount of available storage space occupied by various media items stored within the user account.

Storage indicators 652 may include total storage value 656, and storage indicator 662 may include total storage value 666. Total storage value 656 may correspond to the total amount of storage available on the content management system for uploading photographs, whereas total storage value 666 may correspond to the total amount of storage available on the content management system for uploading videos. In some embodiments, total storage values 656 and 666 may be equal and may correspond to the total amount of storage available within the user account on the content management system. For example, the total storage available within the user account may be 8 GB, and total storage values 656 and 666 may indicate that each storage indicator may only have 8 GB to use for that particular media type. In some embodiments, current photograph storage value 654 may indicate the amount of storage occupied within the user account by photographs. For example, current photograph storage value 654 may indicate that the user has 1 GB of photographs stored within the user account. In some embodiments, current video storage value 664 may indicate the amount of storage occupied within the user account by videos. For example, current video storage value 664 may indicate that the user has 2 GB of videos stored within the user account. In some embodiments, 1 GB of storage for photographs and 2 GB of storage for videos may indicate that the user has 3 GB of storage used for media items out of 8 GB of total available storage space. However, the two current storage values need not be aggregated against the total value, and there may be 8 GB of storage space available for both videos and/or photographs. Persons of ordinary skill in the art will also recognize that any amount of storage space and current storage levels may be used, and the use of 8 GB of total space, 1 GB for photographs, and 2 GB for videos is merely exemplary.

In some embodiments, the content management system may run one or more performance or storage algorithms on the user device to determine the current storage level on the user device. For example, a performance algorithm may be sent to the user device from the content management system, which may be used to calculate the total amount of storage available on the user device. The algorithm may then cause the user device to send the calculations back to the content management system. In response to calculating the storage level of the user device, the content management system may send viewing options back to the user device for the user to decide how to view some or all of the content stored within their account on the content management system. Although the aforementioned example has the algorithm sending to the device, calculating information on the device, sending the calculation back to the content management system, and then sending display options back to the device, persons of ordinary skill in the art will recognize that any one of these steps may be performed by either the content management system and/or the user device.

In response to calculating the amount of storage space available on the user device, the user device may display various grid view options. The various grid view options may indicate to the user a variety of ways that some or all of the images stored within the user account may be viewed. Continuing with the aforementioned example, there may be 100 MB of storage space available on the user's user device, and 1 GB of photographs stored in the user account on the content management system. Display option 610 may indicate to the user that it may be possible to display 10 photographs in a grid view, with each image being 10 MB large, thus totaling 100 MB. Display option 612 may indicate that the user may view 100 photographs in a grid view each being 1 MB large, thus totaling 100 MB. Furthermore, display option 614 may indicate that the user may view 1000 photographs in a grid view, each being 100 kB large, thus totaling 100 MB as well. A user may select any of these options, or any additional options for displaying any amount of images in any size. For example, the user may select display option 612, and user interface 600 may display image set 622. Image set 622 may include 100 photographs each being 1 MB in size.

Figure 7:
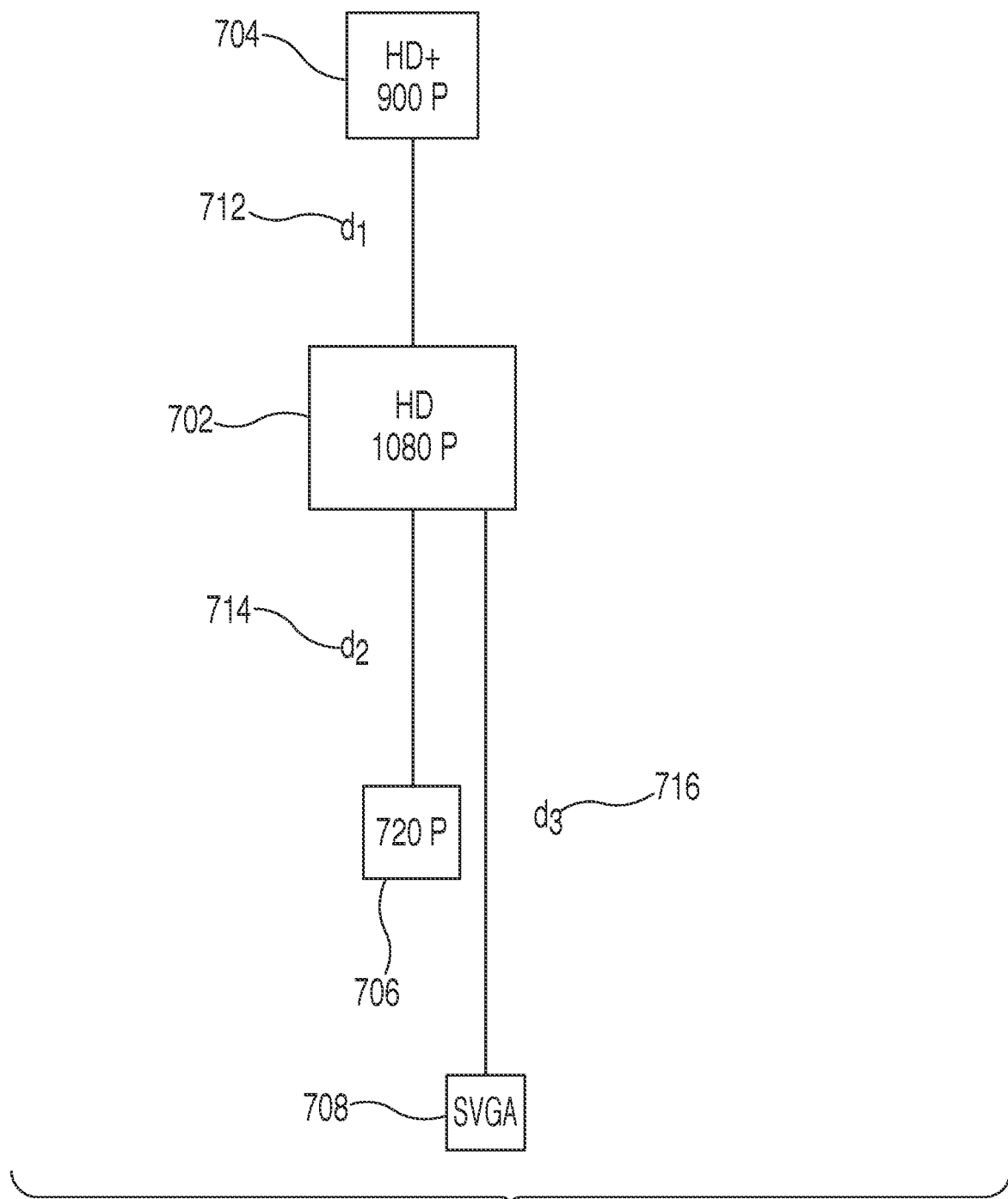
FIG. 7 shows an illustrative block diagram displaying the resolution of various grid views based on the distance from a current display window in accordance with various embodiments.

FIG. 7 shows an illustrative block diagram displaying the resolution of various grid views based on the distance from a current display window in accordance with various embodiments. Current window 702 may correspond to an image or a set of images currently displayed by a user interface, such as user interface 200 of FIG. 2. The currently displayed images may be of a first resolution. For example, images displayed within the current user interface may be 1080p high-definition image (1920×1080, 2,073,600 pixels). As another example, images displayed within the current window may correspond to a grid of images, where each image in the grid has a resolution of 256×256 pixels.

In some embodiments, there may be one or more additional images and/or sets of images which may be displayed within a non-current window. Non-current windows may correspond to any window that is not currently displayed within the user interface, but may be displayed within the user interface at some point in time. For example, non-current window 504 of FIG. 5 may be displayed in response to a gesture by the user (e.g., a swipe), to transition from current window 502 to non-current window 504. In order to minimize the amount of storage space occupied on the user's user device, images included within non-current windows may be stored in a lower resolution. The resolution of images included within either a currently displayed window and/or a non-current window may depend on a distance between the currently displayed window and the corresponding non-current window. For example, display window 704 may correspond a non-current display window having a distance d1 away from current window 702. In some embodiments, if a non-current window has a distance d1, the non-current window may include one or more images having a resolution lower than that of the resolution of the images within current window 702. For example, non-current window 704 may include one or more images having a resolution of 900p (1600×900, 1,440,000 pixels). As another example, if current window 702 includes a grid of images having a resolution of 100×100 pixels, non-current window 704 may include a grid of images having a resolution of 75×75 pixels.

In some embodiments, non-current windows 706 and 708 may respectively have distance d2 and d3. The various distance may correspond to the resolution of the image or images included within the respective windows. For example, window 706, which has distance d2, may include images having a resolution of 720p (1280×720, 829,440 pixels). As another example, window 708, which has distance d3, may include images having an SVGA resolution (800×600, 480,000 pixels). As yet another example, non-current window 706 and/or 708 may include a grid of images having a resolution smaller than that of non-current window 704, such as 64×64 pixels or smaller. In some embodiments, greater distances between a currently viewed window or image and a non-current window or image may lead to the non-current window or image having a smaller resolution.

Figure 8:
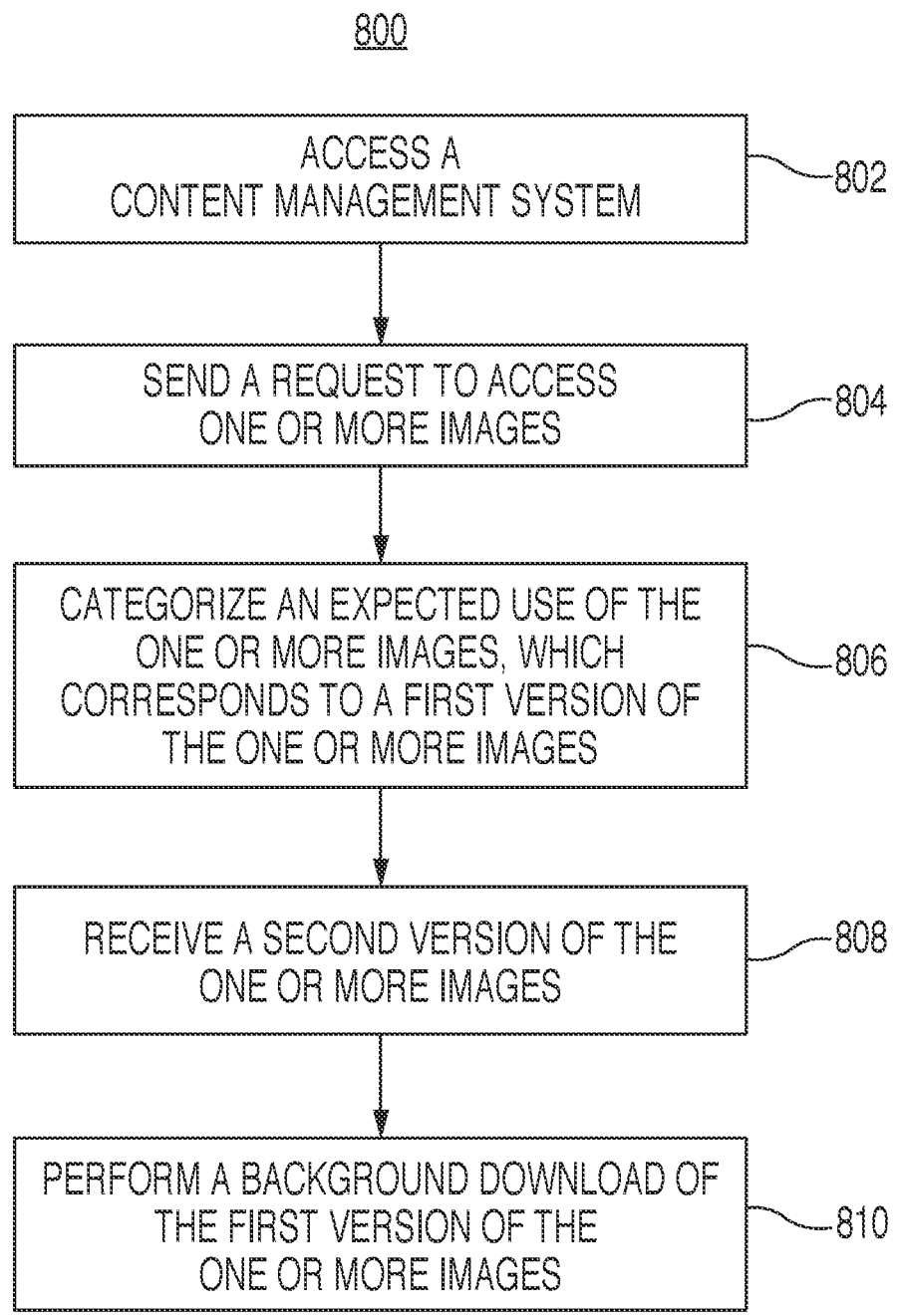
FIG. 8 shows an illustrative flowchart of a process for performing a background download of an image in accordance with various embodiments.

FIG. 8 shows an illustrative flowchart of a process for performing a background download of a content item, such as an image, in accordance with various embodiments. Process 800 may begin at step 802. At step 802, a user device may access a content management system over a communications network. For example, devices 102 may send one or more requests to access an authorized account (e.g., a user account) on content management system 100 across network 104. In some embodiments, accessing the content management system may include a user inputting a user name, password, or any other identification information or credentials, or any combination thereof. In some embodiments, once the user is granted access to the content management system, the supplied login credentials may be stored on the user device and/or the content management system.

At step 804, a request to access one or more images from the content management system may be sent from the user device to the content management system. The request may be sent in response to the content management system granting access to the user device. For example, once logged into the user account on the content management system, the user may select one or more images stored within the user account. In response to selecting the one or more images, the user may request to download the selected images from the content management system to the user device. In some embodiments, the request may correspond to a request to download the one or more images from the content management system.

At step 806, the one or more images requested to be accessed may be categorized by an expected use for the one or more images. In some embodiments, the categorization may determine whether the expected use of the one or more images corresponds to the image(s) being downloaded in a first version. For example, the categorization may determine that the one or more images will be viewed in a single image view. In some embodiments, images viewed in a single image view may be downloaded in a high resolution, such as 1080p, as opposed to images included in a grid view, which may be viewable and/or downloaded in a lower resolution, such as a thumbnail resolution.

In some embodiments, categorizing the one or more images may include collecting the one or more images based on various factors. For example, the categorization may collect the one or more images based whether local access to the one or more images may be available on the user device. As another example, the categorization may collect the one or more images based on whether the user has scrolled a page displayable on a user interface of the user device where the one or more images appears. As still yet another example, the categorization may collect the images based on whether an action has been taken on/with the one or more selected images. The categorization may collect the one or more images with other images that the user has previously or recently shared. In some embodiments, the one or more images may be collected with other shared images. The categorization may also collect images based on a recent upload by the user to the content management system, recently viewed images, or a time frame that an image was captured or viewed within. At step 808, the one or more categorized images may be received in a second version. For example, if the selected images are to be viewed in a single image view but the connection between the user device and the content management system is low, then the images may first be downloaded in a low resolution. This may allow the user to view the images at a substantially same time as the categorization, enabling the user to fully interact with a version of the images without any latency period.

At step 810, a background download of the first version of the one or more images may be performed. The background download may download the first version of the one or more images to the user device while the second version of the one or more images may be viewed on the user device. For example, while the level of connection between the user device and the content management system is low, the user may first download a low resolution version of the image. In some embodiments, the background download of the first version of the one or more images may occur while the second version of the one or more images continues to download. While the low resolution version of the image is viewed on the user device, a high resolution version of the image may download in the background. Due to the level of connectivity being low, the higher resolution image may, for example, take a longer time to download. Thus the user may be able to view and interact with the low resolution image first, while the high resolution version downloads.

In some embodiments, the request to download may include a request to download multiple images, which may be dynamically prioritized for downloading within a collection. In some embodiments, categorizing and dynamically prioritizing the images may include displaying the images on a user interface within the collection. For example, image 404 of FIG. 4 may be downloaded and displayed within collection 460 on user interface 400. In some embodiments, the categorization and dynamic prioritization may include associating any user actions performed on the images within the collection as if the content management system ran solely on the user device. This may allow the user to have a substantially local feel on their user device no matter the level of connectivity between the user device and the content management system.

In some embodiments, the images may initially be presented within the user interface in a grid view. For example, each image included within the grid view may be presented in the second version (e.g., thumbnail resolution). In response to a selection by the user, the one or more images may be presented in the first resolution in the single image view. For example, a user may be presented with a plurality of images in grid view in a thumbnail resolution. In response to a user selection to view one or more of the plurality of images, the selected images may be presented in high-definition.

In some embodiments, the images may be stored within the user account on the content management system. However, within the user account there may be more images than displayable within one window on the user interface displaying a grid view. For example, the grid view may be capable of displaying one hundred (100) images, whereas there may be one thousand (1,000) images in the user account. In this scenario, each image downloaded to be displayed within the grid view of a currently displayed window on the user interface may be in the second version (e.g., having a thumbnail resolution). In some embodiments, any of the additional images not currently displayed within the current window on the user interface may be downloaded in the second version, and the resolution type may be dependent on the proximity between the current window and the non-current window. For example, images included within a non-current but sequentially proximate window to the current window may have a lower resolution than the thumbnail resolution (e.g., 64×64 pixels), whereas images included within a non-current window that is not sequentially proximate to the current window may be downloaded in a lowest resolution available (e.g., 50×50 pixels).

Thus, images having a small distance (e.g., close in proximity to the currently displayed window) may have a resolution that may be lower than the first resolution, whereas images having a large distance (e.g., not close or substantially far from the currently displayed window) may have a resolution that may be lower than the first resolution and the second resolution. For example, images not currently displayed on the user device may have a lower resolution than an image currently displayed on the user interface. The greater a distance away between the currently viewed image a particular image may be, the smaller the resolution may be. This may be beneficial to a user while they are scrolling through a large amount of images, as the scrolling may be much smoother because of the amount of latencies to access images may be minimized.

In some embodiments, dynamically prioritizing the background download may be based on various factors. For example, the prioritization may be based on available access to the one or more images selected to be viewed in a single image view, and may be assigned a first priority level. As another example, the prioritization may be based on available access to one or more additional images located within the same collection as the selected one or more images belongs to. In this scenario, a second priority level may be assigned to the one or more selected images. As yet another example, the prioritization may be based on whether an action with/to the one or more selected images has been performed. In this scenario, a third priority level may be assigned to the one or more images.

In some embodiments, the various priority levels may correspond to a ranking level for downloading images. For example, an image assigned a higher ranking level may be downloaded before an image with a lower ranking level. Any permutation of rankings may be used. For example, the first priority level may be ranked higher than the second and third priority levels, where the second priority level may be ranked higher than the third priority level or vice versa. Similarly, the second priority level may be ranked higher than the first and the third priority levels, where the first priority level may be ranked higher than the third, or vice versa. Additionally, the third priority level may be ranked higher than the first and second priority levels, where the first priority level may be ranked higher than the second, or vice versa. Persons of ordinary skill in the art will recognize that the use of a first, second, and third priority level is merely exemplary, and any number of priority levels, and any ordering of these levels, may be used.

In some embodiments, metadata associated with the one or more images may be downloaded to the user device from the content management system. The metadata may be downloaded prior to the one or more images, or at a substantially same time. In some embodiments, the categorization of an expected use of the one or more images may be based, at least in part, on the downloaded metadata. For example, image 404 may include geographical information 404a and temporal information 404b. Geographical information 404a and temporal information 404b may be downloaded along with, or prior to the download of, image 404, and may be used to categorize image 404 within a collection (e.g., collection 460). In some embodiments, the background download may be dynamically prioritized based, at least in part, on the downloaded metadata.

Figure 9:
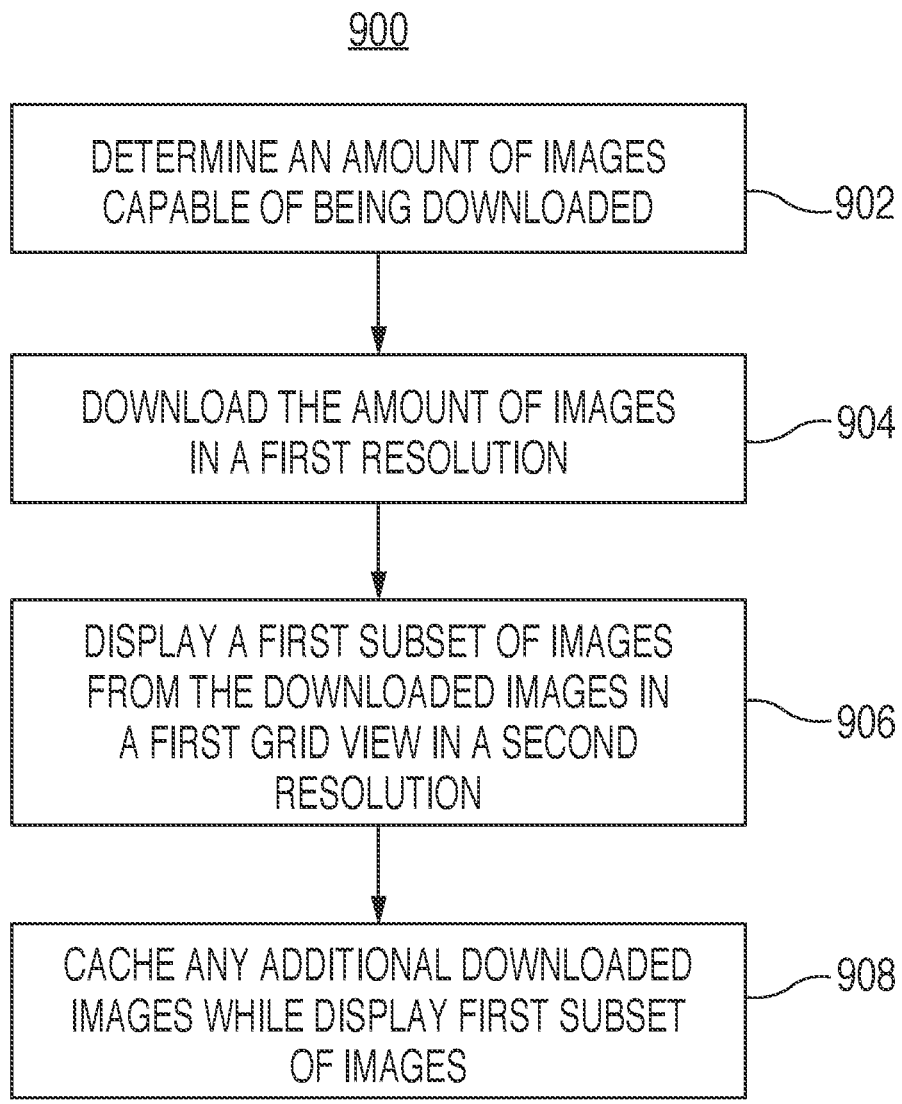
FIG. 9 shows an illustrative flowchart of a process for displaying images and caching images in accordance with various embodiments.

FIG. 9 is an illustrative flowchart of a process for displaying images and caching images in accordance with various embodiments. Process 900 may begin at step 902. At step 902, a determination of an amount of images capable of being downloaded may be made. The determination may include calculating an amount of available storage space on a user device. The amount of images capable of being downloaded may be stored, initially, on another user/individual's device, one or more social media networks, and/or a content management system. In some embodiments, the user may have an authorized account on a content management system, and the quantity of images stored within the account that may be downloadable to the user device may be determined.

In some embodiments, the determination may be based on one or more factors. For example, the amount of images that may be downloadable from the content management system may depend on a level of connectivity between the user device (e.g., client device 102) and the content management system (e.g., content management system 100). If the level of connectivity between the user device and the content management system is weak or low, then the amount of images capable of being downloaded may be lower than if the level of connectivity was high or strong. As another example, if there is no Wi-Fi signal available, and only cellular data signal, then the amount of images capable of being downloaded may be modulated based on the user's current cellular data plan. In this way, the user may not take up a substantial portion of their monthly or annual services, or incur any overage charges. In some embodiments, the user may be able to turn on a Wi-Fi only option, or a Wi-Fi preferred option. For example, the user may select an option within their user settings that would communicate to the device which network conditions to use for downloading one or more images.

In some embodiments, the determination may be based on an amount of available storage space on the user device. For example, the user may only have 100 GB of available storage space, however there may be 1 GB of images stored within the user account on the content management system. In this scenario, the user can be presented with, or may have present, options for downloading the images in various resolutions, such as options 610, 612, and 614 in FIG. 6. As another example, the amount of storage space needed to download images may be less a the total amount of free storage space on the user device. The content management system and/or the user device may limit the amount of images to be downloaded to the user device to correspond with the total amount of free storage space. The content management system and/or the user device may also reduce the size or resolution of the images to correspond with the total amount of free storage space.

In some embodiments, the determination may be based on an amount of available battery charge on the user device. For example, if the user device has a substantially low level of available battery charge, downloading a large number of images, or even a single high-resolution image, may take up a large amount of processing power. This may be a hindrance for the user, especially in the unfortunate situation that the user may need to use their device for an emergency. Thus, if the user device has a substantially low battery level, the amount of images downloadable and/or the size of the images downloadable, may be modified to ensure that there may still be some remaining battery charge on the user device. In this way, the user may be able to use their device in an emergency situation no matter the image quality or quantity downloaded.

At step 904, the determined amount of images may be downloaded to the user device in a first resolution. Continuing with the aforementioned example, option 610 may indicate to the user that, based on the available storage space on the user device, the user may download 10 photographs, each being 10 MB in size (e.g., 100 MB total of storage space).

At step 906, a first subset of images from the downloaded images may be displayed in a first grid view on the user device. The images displayed within the first grid view may be displayed in a second resolution, in some embodiments. For example, the user may select to download 100 images, each being 1 MB in size. The user may display some or all of the 100 images within a grid view, such as set 622 within user interface 600. In some embodiments, the images displayed within the grid view may be of the same resolution as that of the downloaded images. For example, if the user selected option 612 and downloads 100 images, each of a 1 MB resolution, set 622 may display 100 images having a 1 MB resolution. As another example, some or all of the 100 downloaded images may be displayed within the grid view in a lower resolution (e.g., 100 kB), in order to save space, or if a level of connectivity has decreased.

At step 908, any additional images from the downloaded images may be cached while the first subset of images may be displayed within the first grid view. For example, if the user downloads 100 images having a 1 MB resolution, but only displays 50 images, then the remaining 50 may be cached in temporary memory on the user device. This may allow the user to show or present only a select amount of images at a time, while still having the ability to display any of the other images at a later point. In some embodiments, the images initially downloaded may be of a thumbnail resolution (e.g., 75×75 pixels), while the images displayed within the grid view may be of a higher resolution than the thumbnail resolution (e.g., 256×256 pixels). For example, the user may download 1,000 images having a thumbnail resolution and total 100 MB in storage space. However, in response to a user input or selection to display 100 of the images in a grid view, the 100 images may be presented and/or downloaded to the user device in a higher resolution than the originally storage versions.

In some embodiments, an input may be detected that may display a second subset of images. The second subset of images may include images from the first subset and/or the additionally cached images. For example, the user may decide to view all of the user's images from a recent trip to San Francisco. The user may provide one or more inputs to the user device and images corresponding to the user's trip may be detected and organized for display. The images may be organized based on any images stored currently on the user device. Thus, the organizational mechanism (e.g., an organization algorithm) may select images from the currently displayed subset of images and any of the cached images.

In some embodiments, a determination may be made of an aspect ratio of each image stored within the user account on the content management system. The determined aspect ratio may then be used to prioritize the downloading of images. In some embodiments, the aspect ratio may be a factor used in addition to other factors used to determine the amount of images capable of being downloaded to the user device. For example, although it may be determined that all of the user's images may be downloadable based on the level of connectivity, the amount of available storage space, the battery charge of the device, and/or the data plan; some or all of these images may have an aspect ratio non-conforming to the user's user device, and therefore may not be displayable. Thus, in some embodiments, only images having an appropriate aspect ratio may be downloadable. In some embodiments, images having a best or most appropriate aspect ratio may be downloaded prior to any images which have an aspect ratio that may be displayable, but not optimal for viewing, on the user device.

Figure 10:
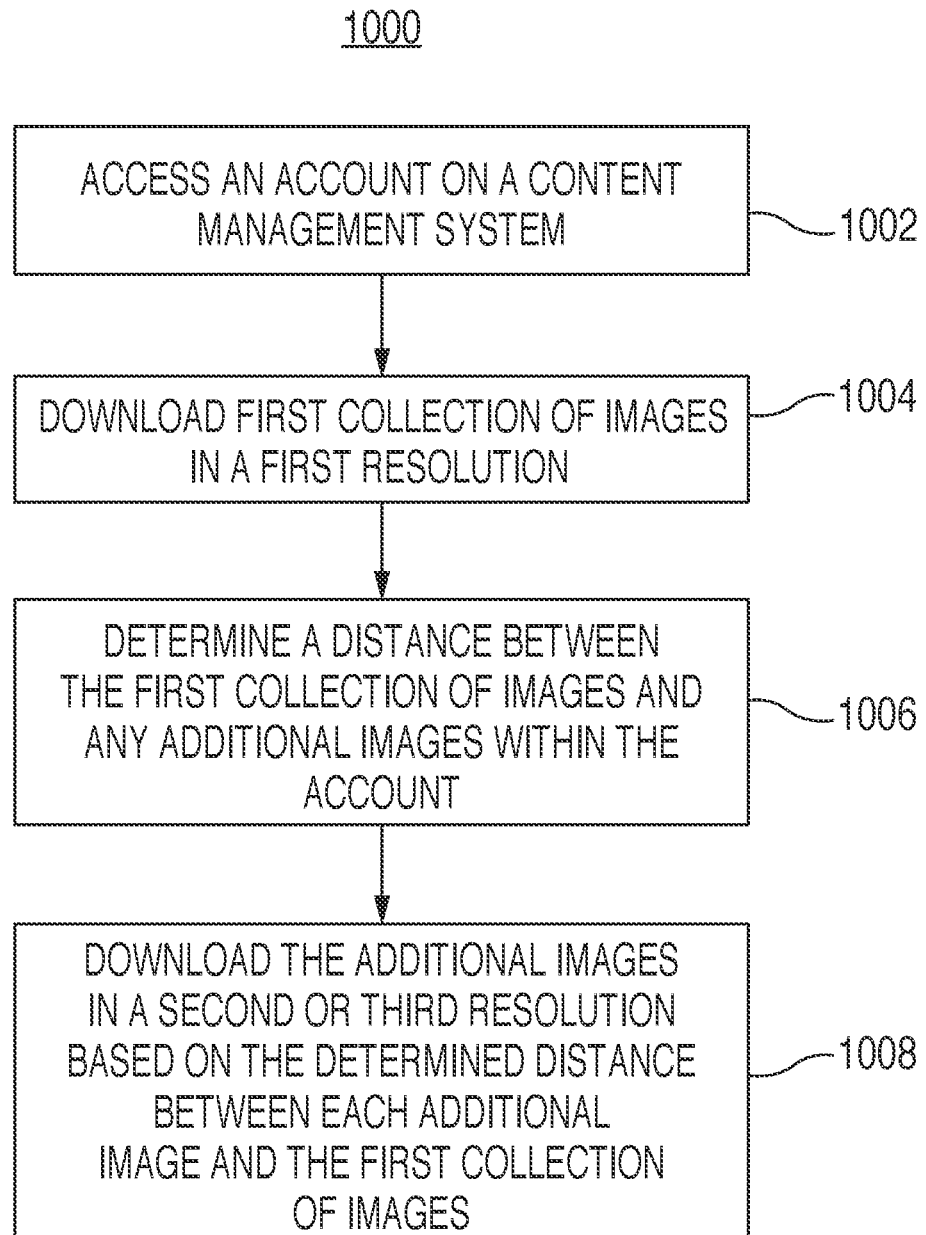
FIG. 10 shows an illustrative flowchart of a process for downloading images based on determined distances between images in accordance with various embodiments.

FIG. 10 is an illustrative flowchart of a process for downloading images based on determined distances between images in accordance with various embodiments. Process 1000 may begin at step 1002. At step 1002, a user may access an account on a content management system. In some embodiments, the account may be associated with the user and may be referred to as the user account. In some embodiments, the user may be required to provide login credentials (e.g., username, password, etc.), in order to be granted access to the user account. The login credentials may, in some embodiments, be stored on the user's user device and may be used for future access the content management system.

At step 1004, a first collection of images may be downloaded from the content management system to the user device. In some embodiments, the first collection of images may be downloaded in a first resolution and may be stored within the user account. For example, the first collection of images may be downloaded in a high-resolution, such as 1080p. Persons of ordinary skill in the art will recognize that any amount of images may be downloaded within the first collection of images, and the images may be of any resolution. In some embodiments, the resolution of the first collection of images may be based on one or more factors. For example, the downloading of the first collection of images may be based on a level of connectivity between the user device and the content management system. As another example, the downloading may be based on an amount of available storage space on the user device and/or an available amount of battery charge of the user device.

In some embodiments, the downloaded first collection of images may be displayed within a user interface presented on a display screen of the user device. For example, images 622 of FIG. 6 may be displayed within user interface 600. In some embodiments, the first collection of images may be downloaded in a block or a page of images. For example, multiple images may be downloaded from the content management system to the user device in blocks of images. The blocks may be compressed files, file directories, or any other blocking, or any combination thereof. In some embodiments, the first collection of images may be displayed in a grid view within the user interface.

At step 1006, a distance metric between the first collection of images and any of the additional images stored within the user account may be determined. In some embodiments, the distance metric may correspond to a distance between a currently viewed window and a non-current window. For example, one or more images may be displayed within current window 702 of FIG. 7. The image(s) displayed within window 702 may, for example, be high-definition images having a 1080p resolution. The content management system and/or the user device may determine a distance metric between the first collection of images and any of the additional images. For example, window 704 of FIG. 7 may include one or more additional images stored within the user account and/or on the user device, and the content management system and/or the user device may determine a distance metric between the first collection of images, and any images included within window 704. In some embodiments, images that may be displayable within a non-current window which may be sequentially proximate to the currently displayed window may be assigned a second resolution. However, in some embodiments, images that are displayable within a non-current window which may not be sequentially proximate to the currently displayed window may be assigned a third resolution. For example, images included within window 704 and/or 706 may be assigned a second resolution (e.g., 75×75 pixels, 256×256 pixels, etc.), as they may be non-current windows that may be sequentially proximate to window 702. However, window 708, which may be a non-current window but not sequentially proximate to current window 702, may be assigned a third resolution (e.g., 64×64 pixels, 50×50 pixels, etc.).

At step 1008, the additional images may be downloaded in a second and/or third resolution based on the determined distance metric between the additional images and the images within the first collection. For example, images included within window 704 may be downloaded in a high-definition resolution (e.g., 900p), whereas images included within window 708 may be downloaded in a SVGA resolution. Thus, images having a small distance (e.g., close in proximity to the currently displayed window) may have a resolution that may be lower than the first resolution, whereas images having a large distance (e.g., not close or substantially far from the currently displayed window) may have a resolution that may be lower than the first resolution and the second resolution. This may aid in appropriately and efficiently downloading images in accordance with the likelihood and/or expectance that the image will be viewed in a relatively small time frame compared to the currently displayed images. Thus, images that may be unlikely to be viewed right after an image that is currently displayed may not be initially downloaded in a high resolution, but rather in a lower resolution to save space.

In some embodiments, each downloaded image may be categorized within the first collection of images and/or the additional images. The categorization may be based on metadata associated with each image. For example, an image may include geographical information 404a and temporal information 404b. Information 404a and 404b may aid in categorizing image 404 within collection 460, which may be displayed in a first resolution. In some embodiments, metadata associated with an additional image stored in the user account may collection the additional image in a collection of additional images not displayed within the user interface. Thus, significant storage space may be saved on the user device by categorizing images that are required or requested for display, and images that may not currently be needed to be viewed at a present moment in time.

Figure 11:
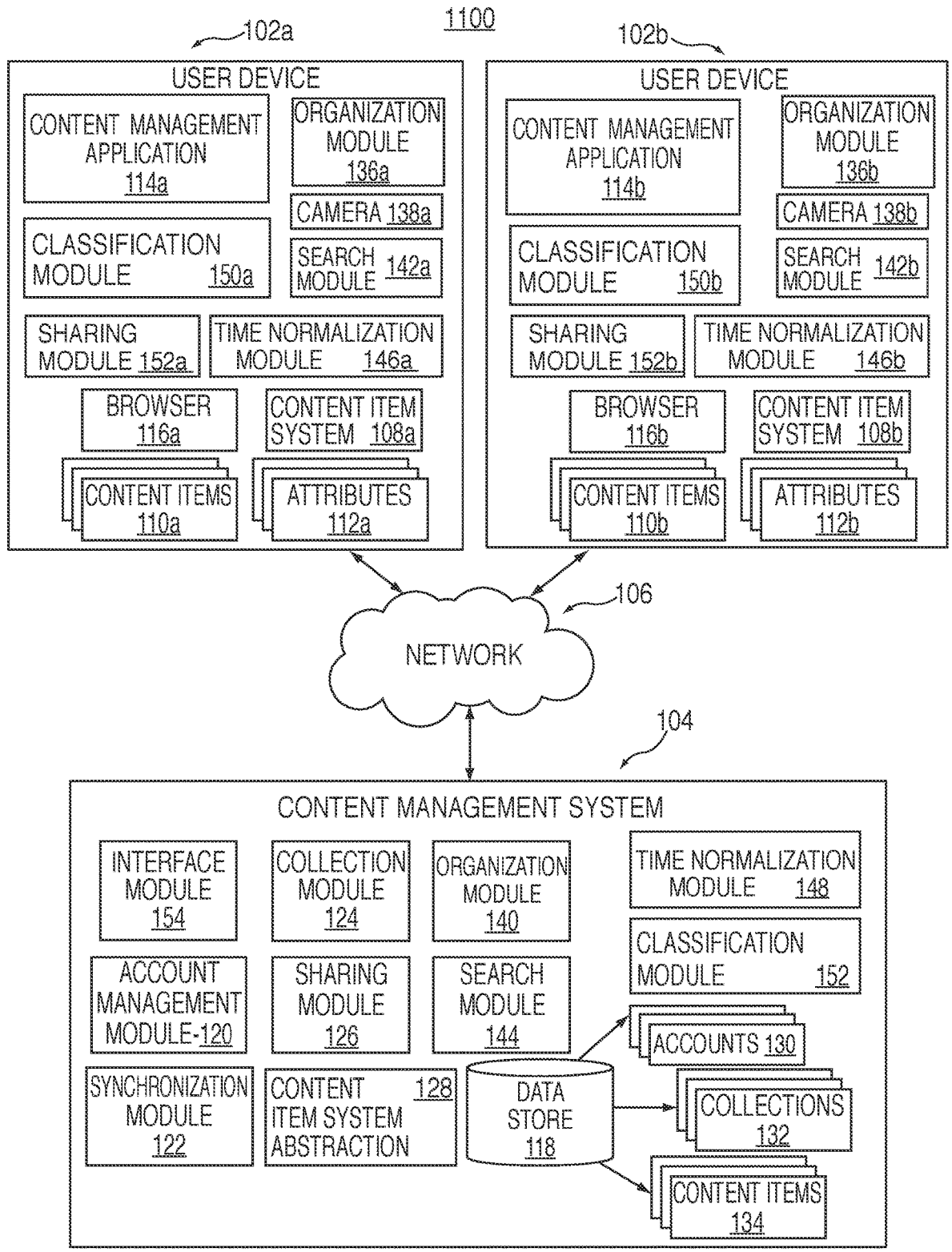
FIG. 11 shows another exemplary system in accordance with various embodiments.

FIG. 11 shows an exemplary system in accordance with various embodiments. In some embodiments, system 1100 of FIG. 11 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110a and 110b (collectively 110), stored locally within content item system 108a and 108b (collectively systems 108) on user device 102 and/or stored remotely on content management system 104 (e.g., within data store 118). For example, user device 102a may access content items 110b stored remotely with data store 118 of content management system 104 and may, or may not, store content item 110b locally within content item system 108a on user device 102a. Continuing with the example, user device 102a may temporarily store content item 110b within a cache locally on user device 102a, make revisions to content item 110b, and the revisions to content item 110b may be communicated and stored in data store 118 of content management system 104. Optionally, a local copy of content item 110a may be stored on user device 102a. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138a and 138b) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item. Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/or 136b) for presentation. Continuing with this example, processing of content items to determine clusters may be an iterative process that may be executed upon receipt of new content items and/or new similarity rules.

In some embodiments, user device 102a may include classification module 150a, while user device 102b may include classification module 150b (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102a may include search module 142a, while user device 102b may include search module 142b, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112a and 112b (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112a and 112b may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114a and 114b (collectively 114), client application, and/or third-party application may be implemented on user devices 102a and 102b, respectively, to provide a user interface to a user for interacting with content management system 104. Content management application 114 may expose the functionality provided with content management interface module 154 and accessible modules for user device 102. Web browser 116a and 116b (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102a may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152a, located on user device 102a, and sharing module 152b located on user device 102b (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts. To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database row.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for managing content items having multiple resolutions, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed:

1. A system comprising:
   at least one processor; and
   at least one non-transitory computer-readable storage medium storing instructions that, when executed by the at least one processor, cause the system to:
   maintain, within a content management system, a collection of content items associated with a user;
   determine that the user accessed a first content item from the collection of content items via a client device associated with the user;
   determine a first relationship between the first content item and a second content item from the collection of content items, wherein the first relationship indicates a likelihood that the second content item will be accessed by the user;

provide, to the client device, the second content item for storage on the client device based on the first relationship indicating the likelihood that the second content item will be accessed based on access of the first content item, wherein providing the second content item to the client device is automatically performed in a background process;

determine a second relationship between the first content item and a third content item; and based on the second relationship between the first content item and the third content item, determine to not provide the third content item to the client device for storage on the client device.

2. The system of claim 1, wherein determining the first relationship between the first content item and the second content item comprises determining an organization relationship between the first content item and the second content item.

3. The system of claim 1, wherein providing the second content item for storage on the client device is based on the first relationship and a previous user action associated with the first content item.

4. The system of claim 1, wherein determining the first relationship between the first content item and the second content item comprises determining a distance metric between the first content item and the second content item.

5. The system of claim 1, further comprising instructions that, when executed by the at least one processor, cause the system to:

access metadata associated with the first content item and metadata associated with the second content item; and wherein determining the first relationship between the first content item and the second content item is based on a comparison of the metadata associated with the first content item and the metadata associated with the second content item.

6. The system of claim 1, wherein determining the first relationship between the first content item and the second content item comprises determining metadata associated with the first content item and the second content item.

7. The system of claim 1, wherein the first relationship indicates a likelihood that the second content item will be accessed by the user within a time frame of the user accessing the first content item.

8. A method comprising:

maintaining, within a content management system, a collection of content items associated with a user account;

determining a user associated with the user account accessed a first content item from the collection of content items via a client device associated with the user;

determining a first relationship between the first content item and a second content item from the collection of content items, wherein the first relationship indicates a likelihood that the second content item will be accessed by the user;

providing, to the client device, the second content item for storage on the client device based on the first relationship indicating the likelihood that the second content item will be accessed based on access of the first content item, wherein providing the second content item to the client device is automatically performed in a background process;

determining a second relationship between the first content item and a third content item; and based on the second relationship between the first content item and the third content item, determining to not provide the third content item to the client device for storage on the client device.

9. The method of claim 8, wherein determining the user accessed the first content item comprises determining the user performed at least one of sharing the first content item, editing the first content item, or viewing the first content item.

10. The method of claim 8, further comprising:

categorizing the first content item based on metadata corresponding to the first content item; and wherein determining the first relationship between the first content item and the second content item comprises determining the first content item and the second content item belong to a same category of content items.

11. The method of claim 8, further comprising:

determining an expected use for the first content item and an expected use for the second content item; and wherein determining the first relationship between the first content item and the second content item is based on the expected use of the second content item.

12. The method of claim 8, wherein providing the second content item for storage on the client device causes the client device to remove a previously stored content item from the storage of the client device.

13. The method of claim 12, wherein the previously stored content item comprises a content identifier corresponding to the second content item, the content identifier associated with a content pointer that identifies a location of the second content item within the content management system.

14. The method of claim 8, wherein determining the first relationship between the first content item and the second content item is based on determining a storage file hierarchy relationship between the first content item and the second content item.

15. A non-transitory computer readable medium storing instructions thereon that, when executed by at least one processor, cause a computing device to:

maintain, within a content management system, a collection of content items associated with a user;

determine the user performed an action with respect to a first content item from the collection of content items via a client device associated with the user;

determine a first relationship between the first content item and a second content item from the collection of content items, wherein the first relationship indicates a likelihood that the second content item will be accessed by the user; and provide, to the client device, the second content item for storage on the client device based on the first relationship indicating the likelihood that the second content item will be accessed based on access of the first content item, wherein providing the second content item to the client device is automatically performed in a background process;

determine a second relationship between the first content item and a third content item; and based on the second relationship between the first content item and the third content item, determine to not provide the third content item to the client device for storage on the client device.

16. The non-transitory computer readable medium of claim 15, wherein determining the user performed an action with respect to the first content item comprises determining the user performed one of viewing the first content item, sharing the first content item, or modifying the first content item.

17. The non-transitory computer readable medium of claim 15, further comprising instructions that, when executed by the at least one processor, cause the computing device to:
   categorize the first content item based on metadata corresponding to the first content item; and
   determine the first relationship by determining the first content item and the second content item belong to a same category of content items.

18. The non-transitory computer readable medium of claim 15, wherein the first content item and the second content item comprise image files.

19. The non-transitory computer readable medium of claim 15, further comprising instructions that, when executed by the at least one processor, cause the computing device to determine the first relationship between the first content item and the second content item by determining a file hierarchy relationship between the first content item and the second content item.

20. The non-transitory computer readable medium of claim 15, wherein:
   providing the second content item for storage on the client device causes the client device to remove a previously stored content item from the storage of the client device, the previously stored content item comprising a content identifier corresponding to the second content item and associated with a content pointer that identifies a location of the second content item within the content management system.

* * * * *